(12) United States Patent
Son

(10) Patent No.: US 11,316,562 B2
(45) Date of Patent: Apr. 26, 2022

(54) METHOD AND APPARATUS TO ACTIVATE AND DEACTIVATE CSI REPORTING ON PUCCH IN A MOBILE COMMUNICATION SYSTEM

(71) Applicant: Yeongmoon Son, Yongin-si (KR)

(72) Inventor: Yeongmoon Son, Yongin-si (KR)

( * ) Notice: Subject to any disclaimer, the term of this patent is extended or adjusted under 35 U.S.C. 154(b) by 32 days.

(21) Appl. No.: 16/363,280

(22) Filed: Mar. 25, 2019

(65) Prior Publication Data

US 2019/0296805 A1 Sep. 26, 2019

Related U.S. Application Data

(60) Provisional application No. 62/648,329, filed on Mar. 26, 2018.

(51) Int. Cl.
*H04B 7/0413* (2017.01)
*H04W 76/27* (2018.01)
*H04L 5/00* (2006.01)
*H04W 72/04* (2009.01)

(52) U.S. Cl.
CPC ......... *H04B 7/0413* (2013.01); *H04L 5/0048* (2013.01); *H04W 72/0413* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2015/0036666 A1* | 2/2015 | Blankenship | H04W 56/0045 370/336 |
| 2015/0296522 A1* | 10/2015 | Bergstrom | H04B 7/0456 370/329 |
| 2018/0279152 A1* | 9/2018 | Kim | H04W 24/10 |
| 2019/0260447 A1* | 8/2019 | Nam | H04B 7/0626 |
| 2020/0351851 A1* | 11/2020 | Aiba | H04W 72/042 |
| 2020/0412430 A1* | 12/2020 | Song | H04W 72/0453 |

* cited by examiner

*Primary Examiner* — Saba Tsegaye
(74) *Attorney, Agent, or Firm* — Novick, Kim & Lee, PLLC; Sang Ho Lee; Hyun Woo Shin

(57) ABSTRACT

Data transfer method and apparatus for use in a mobile communication system are provided. Method to control the MIMO resources includes receiving MAC Control Element related with MIMO resource, adapting the MIMO resource according to the received MAC Control Elements, detecting a specific event impacting MIMO resource and adapting the MIMO resource according to the detected event.

2 Claims, 21 Drawing Sheets

FIG. 13A

| A/D | Serving Cell ID | | | BWP ID | | Oct 1 |
|---|---|---|---|---|---|---|
| R | R | R | IM | SP CSI-IM Resource Set ID | | Oct 2 |
| R | R | R | R | SP CSI-IM Resource Set ID | | Oct 3 |
| R | R | TCI State ID$_0$ | | | | |

⋮

| R | R | TCI State ID$_N$ | OctN+4 |
|---|---|---|---|

FIG. 13B

| R | Serving Cell ID | BWP ID | Oct 1 |
|---|---|---|---|
| R | R | R | R | SP ZP CSI-RS Resource Set ID | Oct 2 |

FIG. 13C

| R | Serving Cell ID | BWP ID | Oct 1 |
| $S_7$ | $S_6$ | $S_5$ | $S_4$ | $S_3$ | $S_2$ | $S_1$ | $S_0$ | Oct 2 |

FIG. 13D

| A/D | Serving Cell ID | BWP ID | Oct 1 |
| R | R | R | SUL | SP SRS Resource Set ID | Oct 2 |
| $F_0$ | Resource $ID_0$ | Oct 3 |
| ⋮ | | |
| $F_{N-3}$ | Resource $ID_{N-3}$ | Oct N |

FIG. 13E

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)*8-7}$ | $T_{(N-2)*8-6}$ | $T_{(N-2)*8-5}$ | $T_{(N-2)*8+4}$ | $T_{(N-2)*8-3}$ | $T_{(N-2)*8+2}$ | $T_{(N-2)*8+1}$ | $T_{(N-2)*8}$ | Oct N |

FIG. 13F

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)*8-7}$ | $T_{(N-2)*8-6}$ | $T_{(N-2)*8-5}$ | $T_{(N-2)*8+4}$ | $T_{(N-2)*8-3}$ | $T_{(N-2)*8+2}$ | $T_{(N-2)*8+1}$ | $T_{(N-2)*8}$ | Oct N |

METHOD AND APPARATUS TO ACTIVATE AND DEACTIVATE CSI REPORTING ON PUCCH IN A MOBILE COMMUNICATION SYSTEM

CROSS-REFERENCE TO RELATED APPLICATION

This application claims the priority and benefit of U.S. Provisional Patent Application No. 62/648,329, filed Mar. 26, 2018, the disclosure of which is incorporated herein by reference.

BACKGROUND OF THE INVENTION

1. Field of the Invention

The present disclosure relates to a mobile communication system. More specifically, the present disclosure relates to a method to control MIMO resource according to the received control message or to the detected event.

2. Description of the Related Art

Mobile communication systems were developed to provide mobile users with communication services. With rapid technological advancements, the mobile communication systems have evolved to the level capable of providing high speed data communication service to support various QoS requirements.

In the mobile communication system called NR (Next Radio) which is being developed, to cope with very high frequency band where NR UE will operate, NR MIMO is expected to be extensively used. For efficient MIMO operation, MIMO resource/states should be quickly adapted. To achieve this, MAC CEs are used to control MIMO resource/states in the active BWPs of activated serving cells. In this disclosure, solutions are provided to enhance the efficiency of MIMO operation when a BWP switches or a carrier is deactivated.

SUMMARY

Aspects of the present disclosure are to address at least the above mentioned problems. Accordingly, an aspect of the present disclosure is to provide a method and an apparatus to control MIMO resource depending on the detected event.

In accordance with an aspect of the present disclosure, a method to transmit and receive common control channel message is provided. In the method, UE performs MIMO resource related operation 1 for a specific BWP of a specific serving cell when a specific MAC Control Element is received. UE performs MIMO resource related operation 2 for a specific BWP of a specific serving cell when the EVENT 1 is detected for the serving cell. UE performs MIMO resource related operation 3 for a specific BWP of a specific serving cell when the EVENT 2 is detected for the BWP of the serving cell. UE performs MIMO related operation 4 for all serving cells when the EVENT 3 is detected.

BRIEF DESCRIPTION OF DRAWINGS

FIGS. 13A-13H is a diagram illustrating octets of MAC CEs.

DETAILED DESCRIPTION

Figure 1A:
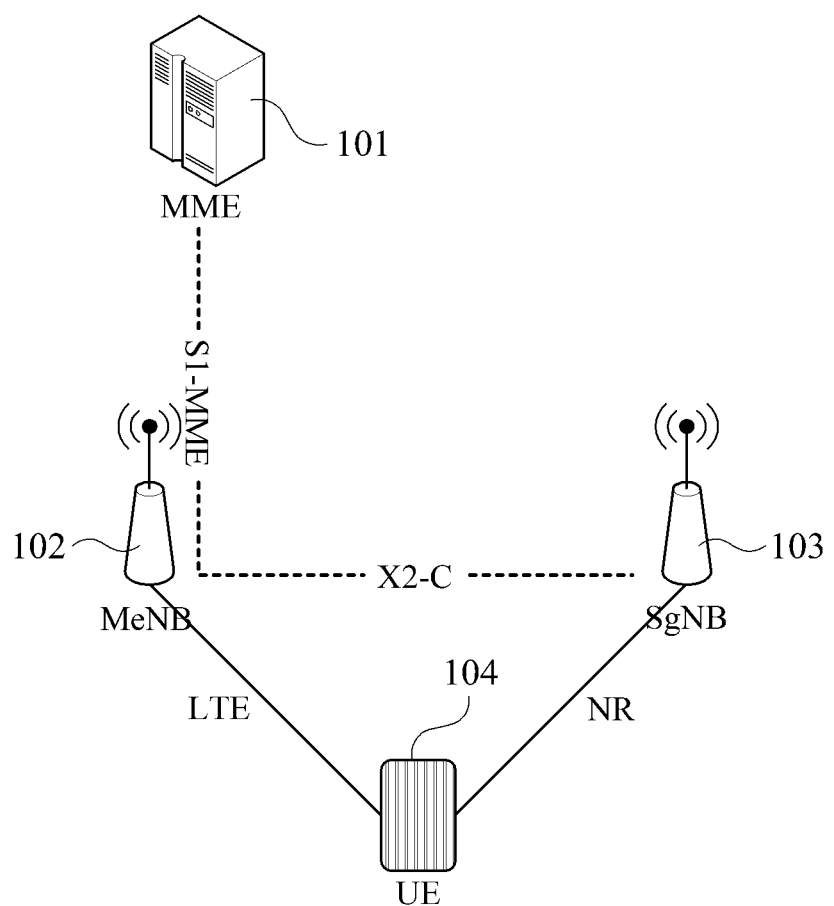
FIGS. 1A and 1B are diagrams illustrating a mobile communication system architecture according to various embodiments of the present disclosure.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

The following description with reference to the accompanying drawings is provided to assist in a comprehensive understanding of various embodiments of the present disclosures as defined by the claims and their equivalents.

Terminologies used in the disclosures are explained below. Numerology defines a specific time duration e.g. the length of an OFDM symbol. Numerology and subcarrier spacing (hereafter SCS) have one to one relationship. In LTE, SCS is 15 KHz and the length of an OFDM symbol is 1/14 ms. In NR, SCS is either 15 KHz, 30 KHz, 60 KHz, 120 KHz or 240 KHz. The length of an OFDM symbol is inverse proportional to SCS. SCS, numerology and symbol length are corresponding each other and interchangeable in the disclosures. Subframe is time unit with 1 ms duration. Time slot (or slot) is time unit consisting with N symbols. N is either 7 or 14. Frame structure has same meaning as duplex mode. FS1 is FDD and FS2 is TDD.

Figure 1B:
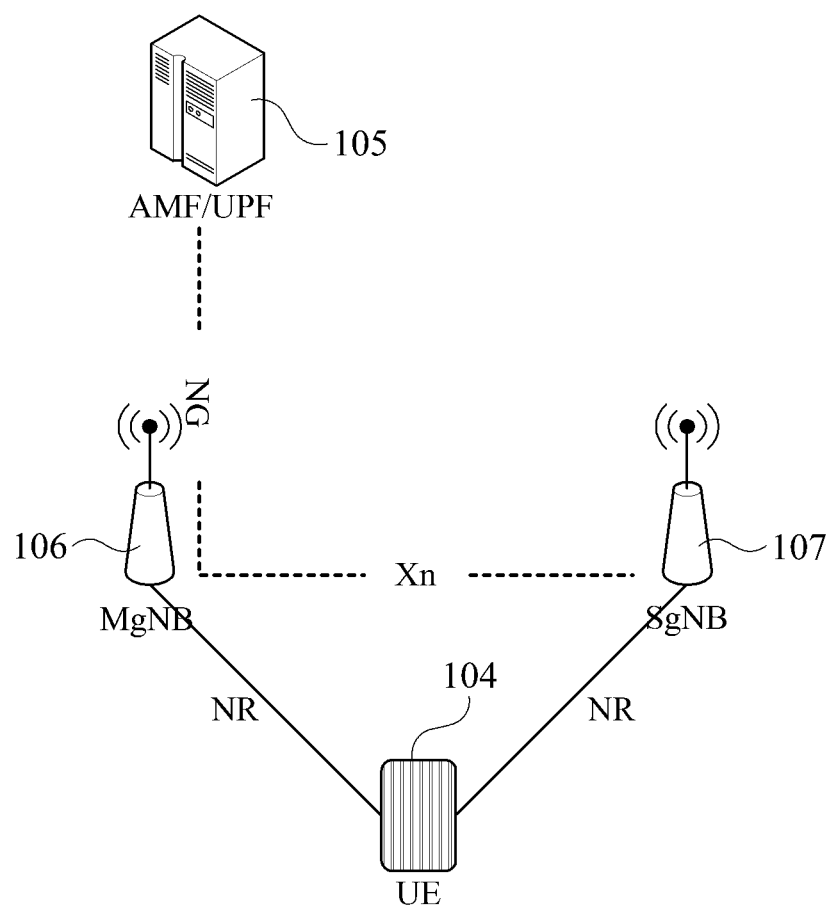

FIGS. 1A and 1B are diagrams illustrating a mobile communication system architecture according to various embodiments of the present disclosure.

Referring to FIGS. 1A and 1B, MME 101 is connected to MeNB 102 via S1 interface. SgNB 103 is connected to MeNB 102 via X2 interface. UE 104 is connected to MeNB 102 and SgNB 103 via a specific radio interface/RAT. UE transmit and receive data with MeNB via a group of cells. The RAT of those cells is LTE/E-UTRA. The group of cells used for communication with MeNB is the 1st cell group (or Master Cell Group). UE transmit and receive data with SgNB via another group of cells. The RAT of those cells is NR. The group of cells used for communication with SgNB is the 2nd cell group (or Secondary Cell Group).

The mobile communication system explained above is called EN-DC (LTE NR Dual Connectivity). It is possible that UE is connected to only NR cells. AMF/UPF 105 is connected with MgNB 106 or with gNB via NG interface. The interface between gNBs is called Xn.

Referring to FIGS. 1A and 1B, base station is illustrated as a single node. In the real implementation, base station can be comprised of plurality of nodes. For example, a central unit and plurality of distributed unit can be comprised of a single base station and plurality of cells controlled by the base station.

Figure 2:
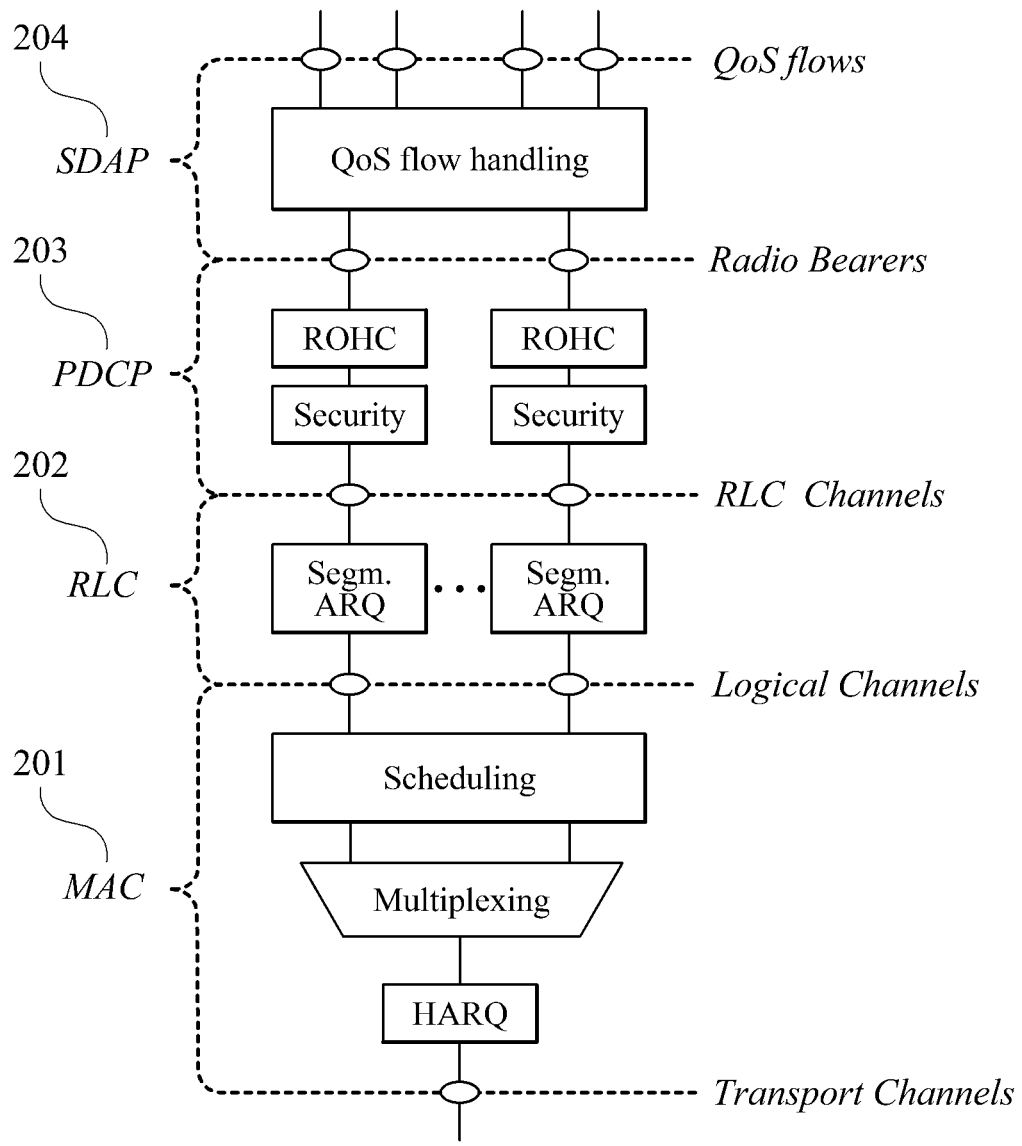
FIG. 2 is a diagram illustrating a protocol stack of a mobile communication system according to various embodiments of the present disclosure.

FIG. 2 is a diagram illustrating a protocol stack of a mobile communication system according to various embodiments of the present disclosure.

Referring to FIG. 2, Protocol stack of UE and base station is comprised of MAC 201, RLC 202, PDCP 203, SDAP 204. Multiple QoS flow/IP packet flows input to SDAP which distribute the IP packet to the appropriate PDCP. The RRC control message between UE and base station is exchanged via SRB (Signaling Radio Bearer). User data/IP packet between UE and base station is exchanged via DRB (Data Radio Bearer). Radio bearer is comprised of PDCP and RLC.

SDAP (Service Data Adaptation Protocol) layer handles QoS per data/service. More specifically, SDAP distribute IP packet received from the upper layer to the appropriate DRB. SDAP inspects SDAP header of the received SDAP PDU to apply reflective QoS. More details on reflective QoS can be found in TS 38.300.

PDCP (Packet Data Convergence Protocol) layer performs header compression/decompression, ciphering/deciphering and integrity protection. PDCP provides temporary lossless data transfer for the case where RLC cannot guarantee lossless data transfer.

RLC (Radio Link Control) layer process the RLC SDU received from PDCP to make the RLC PDU and submit it to the MAC layer. RLC layer performs ARQ (Automatic Retransmission Request) for RLC SDUs to ensure lossless data transfer.

MAC (Medium Access Control) layer multiplexes RLC PDUs, generated by multiple radio bearers configured in the UE, into MAC PDU and submit it to the physical layer. MAC layer demultiplexes RLC PDUs from MAC PDU and forward them to appropriate RLC entity. MAC performs specific operations required for data transfer with base station like random access or uplink timing adjustment.

Figure 3:
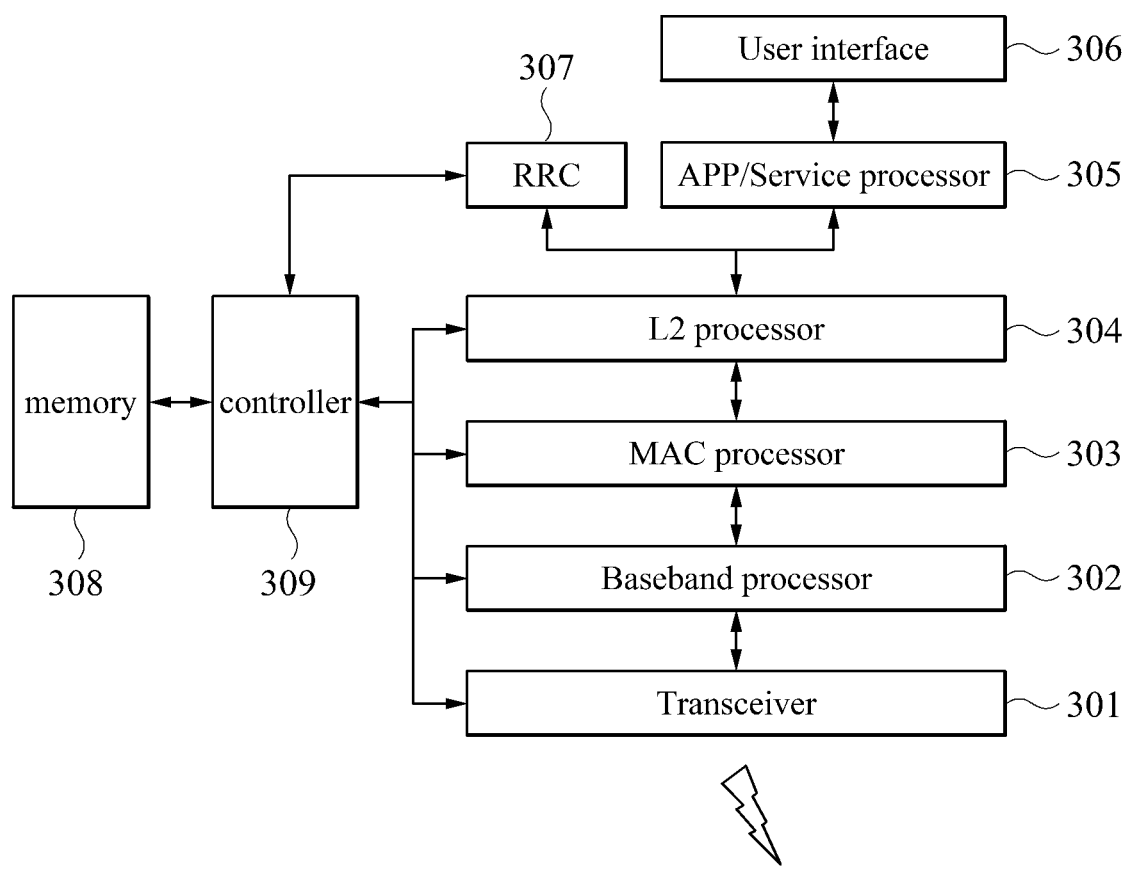
FIG. 3 is a block diagram illustrating a configuration of a terminal according to various embodiments of the present disclosure.

FIG. 3 is a block diagram illustrating a configuration of a terminal according to various embodiments of the present disclosure.

UE consists of transceiver 301, baseband processor 302, MAC processer 303, Layer 2 processor 304, Application/service processor 305, user interface 306, RRC processor 307, memory 308 and controller 309.

Transceiver process the signal received from baseband processor for transmission or process the received signal and forward it to baseband processor.

Baseband processor process (e.g. scrambling, channel coding, modulation etc) bit stream received from MAC processor to send it to transceiver or process the received the signal from the transceiver to forward it to MAC processor.

MAC processor multiplex RLC PDUs from L2 processor into MAC PDU or demultiplex MAC PDU to RLC PDUs to forward them to L2 processor. MAC processor forward MAC control element to controller or multiplex MAC control element into MAC PDU.

L2 processor consists of RLC processor and PDCP processor. L2 processor process RRC message from RRC processor into RLC PDU and process IP packet from appli-cation/service processor into RLC PDU, or vice versa.

Application/service processor processes the input from user interface and generate and forward IP packets to L2 processor for transmission. Application/service processor processes IP packets received from L2 processor and forward relevant to user interface.

User interface consist of display, virtual key board, speaker and microphone, and interact with user.

Memory stores necessary information forwarded from the controller and deliver necessary information to controller based on controller's instruction.

Controller controls the mobile communication in general. UE behavior/operation depicted in the FIG. 5~10 are controlled by controller.

Figure 4:
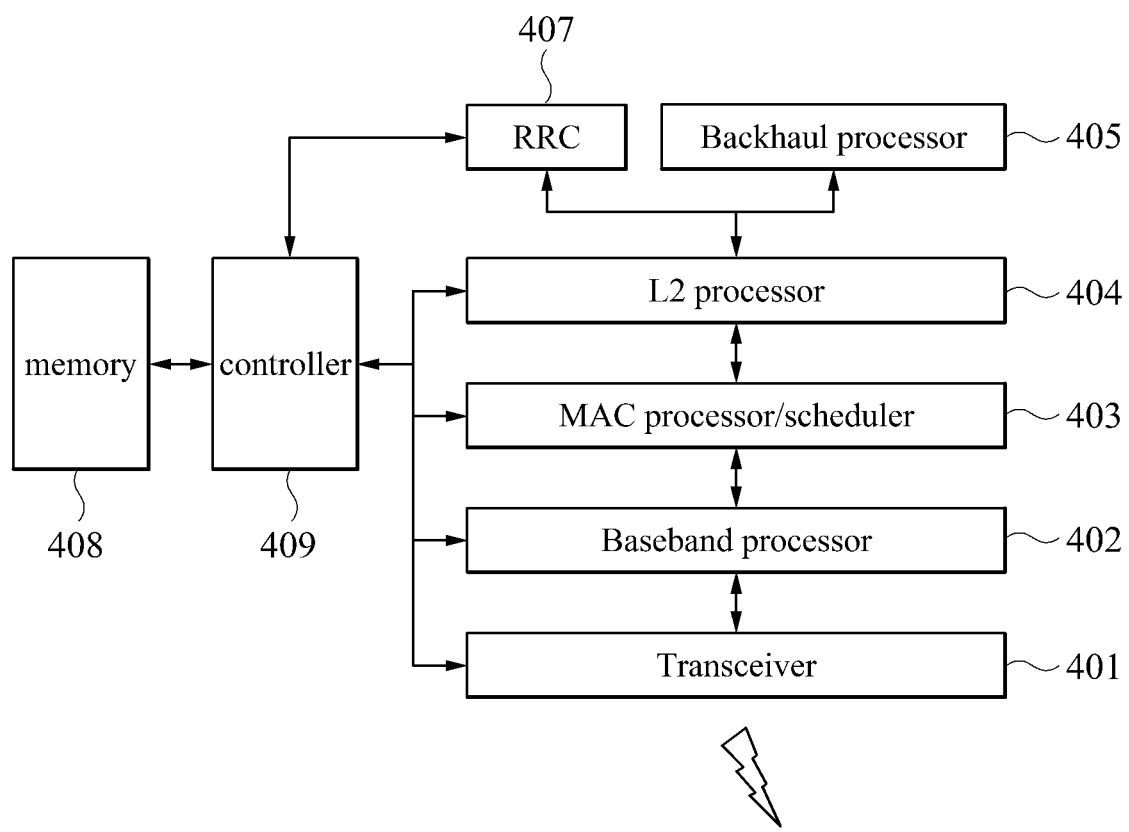
FIG. 4 is a block diagram illustrating a configuration of a base station according to various embodiments of the present disclosure.

FIG. 4 is a block diagram illustrating a configuration of a base station according to various embodiments of the present disclosure.

Node B consists of transceiver 401, baseband processor 402 MAC processor/scheduler 403, Layer 2 processor 404, backhaul processor 405, RRC processor 407, memory 408 and controller 409.

Transceiver process the signal received from baseband processor for transmission or process the received signal to forward it to baseband processor.

Baseband processor process (e.g. scrambling, channel coding, modulation etc) bit stream received from MAC processor to send it to transceiver or process the received the signal from the transceiver to forward it to MAC processor.

MAC processor multiplex RLC PDUs from L2 processor into MAC PDU or demultiplex MAC PDU to RLC PDUs to forward them to L2 processor. It forward MAC control element to controller or multiplex MAC control element into MAC PDU.

Scheduler allocate resource to UEs in the cells controlled by the scheduler.

L2 processor consists of RLC processor and PDCP processor. L2 processor process RRC message from RRC processor into RLC PDU and process IP packet from back-haul processor into RLC PDU, or vice versa.

Backhaul processor communicate with core network node.

Memory stores necessary information forwarded from the controller and deliver necessary information to controller based on controller's instruction.

Controller controls the mobile communication in general. Node B behavior/operation depicted or implied in the FIG. 5~10 are controlled by controller are controlled by controller.

1$^{st}$ Embodiment

In this disclosure, methods and apparatus are provided to select a proper random access procedure when DCI triggering random access procedure is received. UE selects a proper RA procedure among RA procedure 1, RA procedure 2 and RA procedure 3. RA procedure 1 is contention-based random access procedure which is used for transmitting uplink message like RRC message, Buffer Status Report or C-RNTI MAC CE. RA procedure 2 is contention free random access procedure which is triggered when dedicate preamble is allocated. RA procedure 3 is used for beam management where UE transmits preamble on the dedicate uplink resource allocated by Node B. RA procedure 4 is used for beam management where UE transmits multiple pre-amble on the dedicate uplink resource allocated by Node B.

Figure 5A:
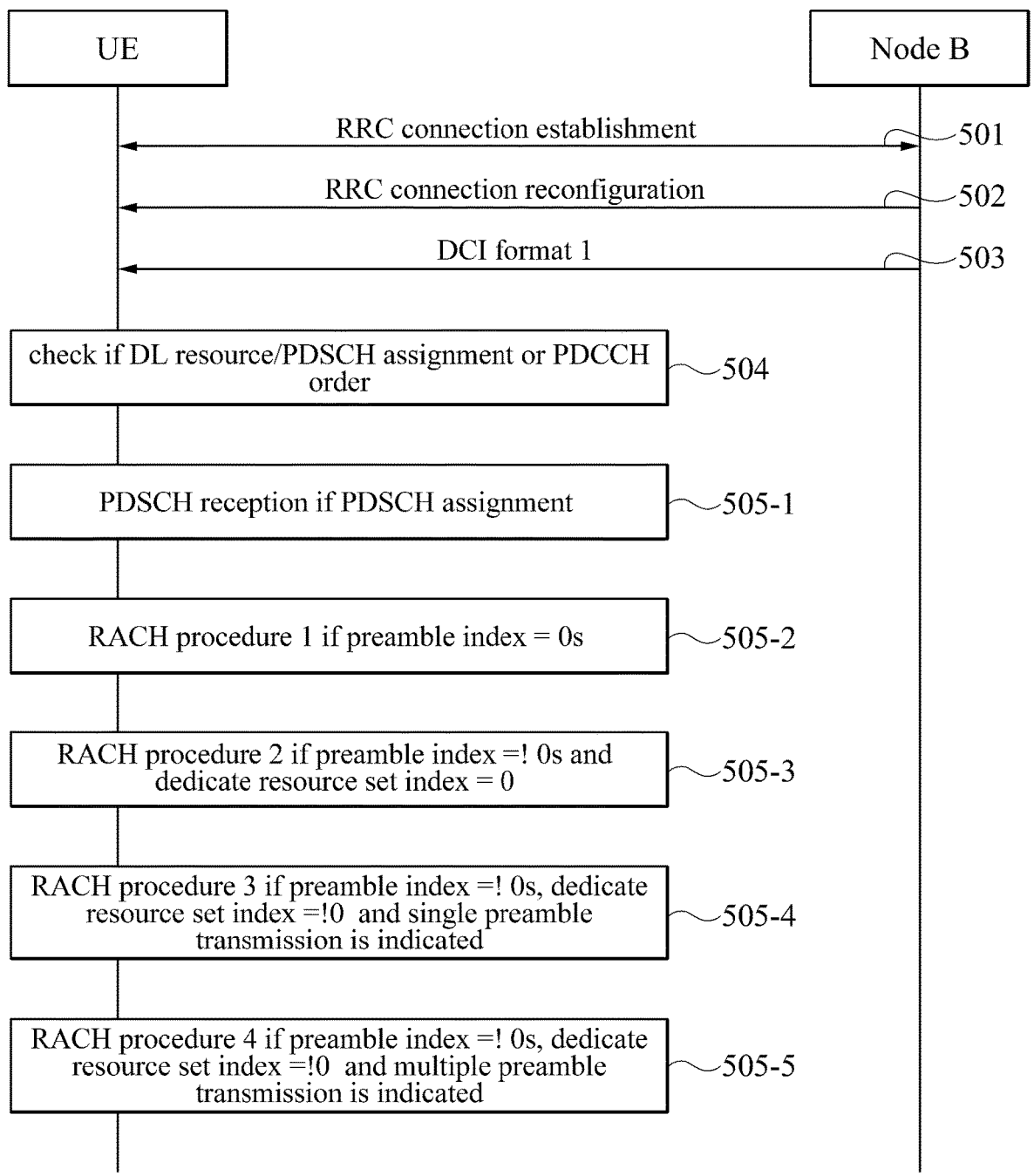
FIG. 5A is a flowchart illustrating selecting and performing proper random access procedure.

FIG. 5A is a flowchart illustrating selecting and performing proper random access procedure.

UE and Node B establishes RRC connection 501. UE and Node B transmit and receive RRC messages via established RRC connection. During the RRC connection establishment procedure, C-RNTI is allocated to the UE.

Node B sends RRCReconfiguration message 502. Node B can configure carrier aggregation with this message. A serving cell can be configured with supplemental uplink if the serving cell has uplink coverage problem. The message including following information:

multiple instances of SCellConfig; each SCellConfig include following information
　physCellId representing the SCell: It can be used for PDSCH scrambling or PUSCH scrambling
　SCellIndex which is short identity of the SCell. It can be used in Activation/Deactivation MAC CE or as carrier indicator in DCI
　FrequencyInfoDL, which indicates the downlink carrier frequency of the SCell
　FrequenyInfoUL, which indicates the uplink carrier frequency of the SCell
　multiple instances of downlink BandwithParts
　multiple instances of uplink BandwidthParts, each of which includes following information
　　DedicateResourceSetConfig, which includes multiple instances of DedicateResourceSet. Each DedicateResourceSet include following information.
　　　DedicateResourceSetId (id 0 is reserved for the case where dedicate resource set is not allocated)
　　　frequency domain dedicated resource e.g. PRB id(s)
　　　time domain dedicate resource e.g. the number of consecutive slots(symbols) that can be used for dedicate resource
　　　time domain distance between PDCCH order and dedicate resource in terms of number of slots
　　　The number of preamble transmissions. It is applicable only if PDCCH order indicates multiple preamble transmissions.

UE receives/detects DCI (e.g. when CRC check for the DCI is successful) on the PDCCH and the received DCI is DCI format 1 503. DCI format 1 is either used for the scheduling of PDSCH in one cell or for triggering RACH in one cell.

UE checks if received DCI format 1 is for PDCSH scheduling or for RACH triggering (e.g. PDCCH order) 1104. If DCI format 1 is used for PDCCH order, DCI format 1 including following fields.

Carrier Indicator, Bandwidth part indicator, Frequency domain resource assignment (all set to 1 or all but the first bit set to 1), time domain resource assignment (all set to 1), Preamble Index (ra-preamble), PRACH mask (indicating the PRACH resource that can be used for RA procedure 1 or RA procedure 2), Dedicate Resource Set id (indicating dedicate uplink resource for RA procedure 3 or RA procedure 4), Dedicate resource transmission type information (indicating either a single preamble transmission on a resource corresponding to the best SSB or CSI-RS, n-times preamble transmissions on n resources each of which is transmitted using different UL Tx beam e.g. beam sweeping, n-times preamble transmission on n resources each of which is transmitted using the same UL Tx beam e.g. beam repetition), all remaining fields (e.g. NDI, HARQ process id, MCS, RV, TPC, DAI etc) are set to zero.

If the carrier indicated by carrier indicator is configured with supplemental uplink, the first bit of frequency domain resource assignment field is used for SUL indicator where 1 indicate the preamble is transmitted in SUL (UL indicated by supplementalUplink) and 0 indicates the preamble is transmitted in the normal UL (e.g. UL indicated by frequency-InfoUL)

If DCI format 1 is used for PDSCH scheduling, DCI format 1 including following fields.

Carrier Indicator, Bandwidth part indicator, Frequency domain resource assignment, time domain resource assignment, NDI, HARQ process id, MCS, RV, TPC, DAI etc UE receives PDSCH if the received DCI format 1 is for PDSCH scheduling 505-1. UE receives PDSCH in PRB of DL BWP, indicated in BWP id field, and indicated by the frequency domain resource assignment field at time instances indicated by time domain resource.

UE triggers RACH procedure 1 if the following conditions are met (if preamble is selected by $1^{st}$ way) 505-2.
  if the received DCI format 1 is PDCCH order; and
  if the ra-PreambleIndex has been explicitly provided by PDCCH; and
  if the ra-PreambleIndex is 0b000000 (e.g. common preamble is used; dedicate preamble is not allocated)

UE triggers RACH procedure 2 if the following conditions are met (if preamble is selected by $2^{nd}$ way and dedicate resource set is not indicated in the PDCCH order) 505-3.
  if the received DCI format 1 is PDCCH order; and
  if the ra-PreambleIndex has been explicitly provided by PDCCH; and
  if the ra-PreambleIndex is not 0b000000 (e.g. dedicate preamble is allocated for this random access); and
  if dedicate resource set id is 0b000 (e.g. dedicate resource set is not used/allocated for this random access)

UE triggers RACH procedure 3 if the following conditions are met (if preamble is selected by $2^{nd}$ way, dedicate resource set is indicated in the PDCCH order and single preamble transmission is indicated) 505-4.
  if the received DCI format 1 is PDCCH order; and
  if the ra-PreambleIndex has been explicitly provided by PDCCH; and
  if the ra-PreambleIndex is not 0b000000 (e.g. dedicate preamble is allocated for this random access); and
  if dedicate resource set id is not 0b000 (e.g. dedicate resource set is used/allocated for this random access); and
  if Dedicate resource transmission type information indicates a single preamble transmission UE triggers RACH procedure 4 if the following conditions are met (if preamble is selected by $2^{nd}$ way, dedicate resource set is indicated in the PDCCH order and multiple preamble transmissions is indicated) 505-5.
  if the received DCI format 1 is PDCCH order; and
  if the ra-PreambleIndex has been explicitly provided by PDCCH; and
  if the ra-PreambleIndex is not 0b000000 (e.g. dedicate preamble is allocated for this random access); and
  if dedicate resource set id is not 0b000 (e.g. dedicate resource set is used/allocated for this random access); and
  if Dedicate resource transmission type information indicates multiple preamble transmission (either beam sweeping or beam repetition)

Figure 5B:
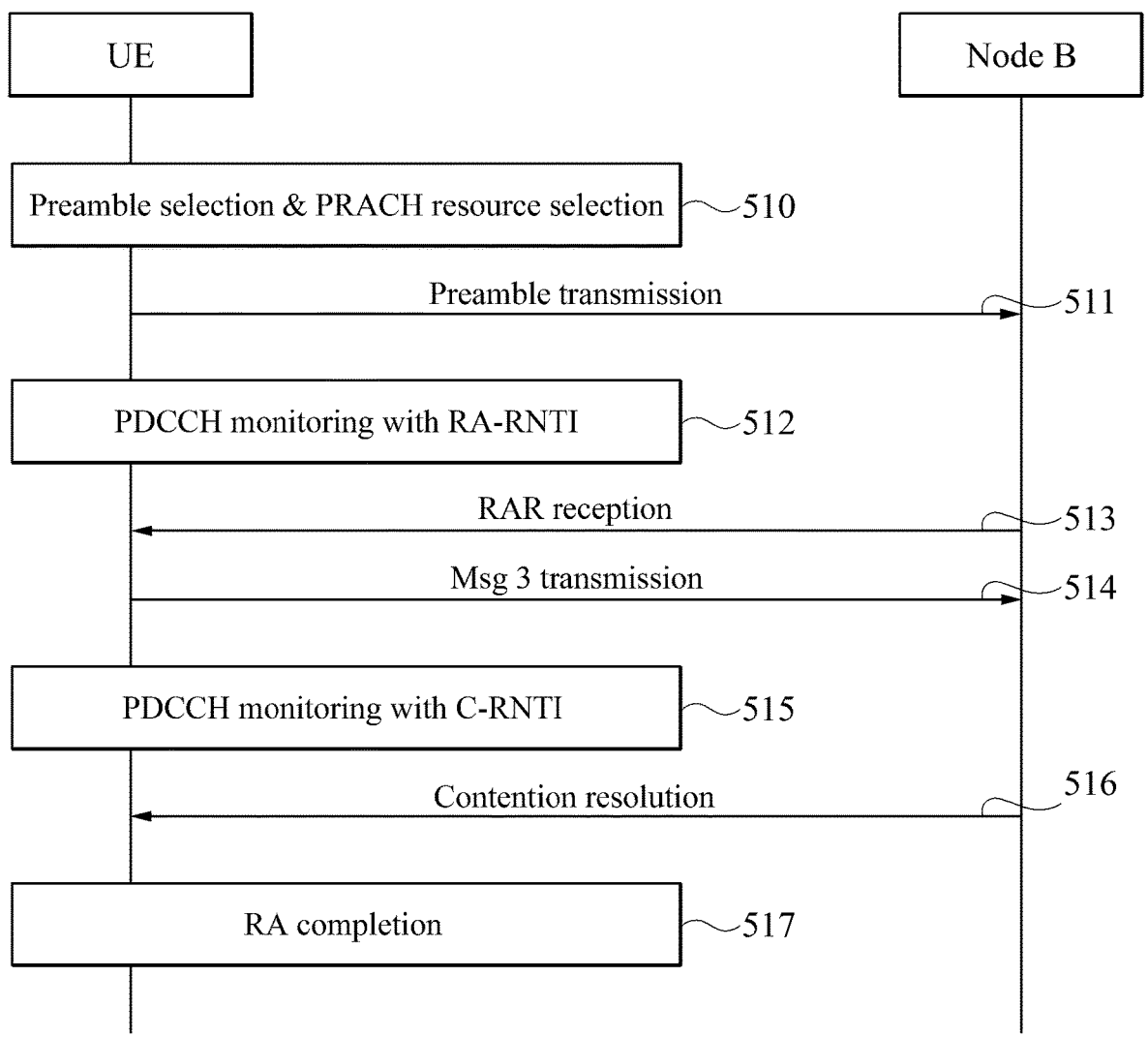
FIG. 5B is a flowchart illustrating random access procedure 1.

FIG. 5B is a flowchart illustrating random access procedure 1.

UE selects preamble to perform random access procedure 510. In the RA procedure 1, preamble is selected by MAC (e.g. random selection). The preambles that UE can use in RA procedure 1 are indicated in the system information. In other words, UE select a ra-PreambleIndex randomly with equal probability from the random access preambles and set PREAMBLE_INDEX to the selected ra-PreambleIndex. UE determines the next available PRACH occasion according to the RACH-config in the system information or in SCell-Config. If SUL is configured for this SCell/Serving cell and SUL indicator in PDCCH order is 0, UE determines the next available PRACH occasion from the PRACH occasions of normal uplink. If the SUL indicator in PDCCH order is 1, UE determines the next available PRACH occasions from the PRACH occasions of supplemental uplink. UE determines the next available PRACH occasion from the PRACH occasions of UL BWP indicated in BWP id of PDCCH order UE transmit the preamble using the selected PRACH and PREAMBLE_INDEX 511.

After transmitting preamble, UE starts the ra-Response-Window at the start of the first PDCCH occasion after a fixed duration of n symbols from the end of the preamble transmission 512. UE monitor the PDCCH of the SpCell for Random Access Response(s) identified by the RA-RNTI while the ra-ResponseWindow is running. RA-RNTI is determined in relation with PRACH occasion where preamble was transmitted.

UE receives RAR 513. If a downlink assignment has been received on the PDCCH for the RA-RNTI and the received TB is successfully decoded, and if the Random Access Response contains a Random Access Preamble identifier corresponding to the transmitted PREAMBLE_INDEX, UE consider the received RAR is the valid RAR and this Random Access Response reception successful.

UE transmits Msg 3 in the UL BWP indicated by the UL grant in RAR 514. Msg 3 contains C-RNTI MAC CE and Buffer Status Report.

Once Msg3 is transmitted, the UE starts the ra-ContentionResolutionTimer and restart the ra-ContentionResolutionTimer at each HARQ retransmission and monitor the PDCCH while the ra-ContentionResolutionTimer is running 515.

Node B transmits Contention Resolution message 516. If the received Msg 3 contains C-RNTI MAC CE, Node B directly schedules the UE using C-RNTI, which is considered as contention resolution.

If PDCCH is received/detected, and if the PDCCH is addressed to the C-RNTI, UE consider this contention resolution is successful 517.

Figure 5C:
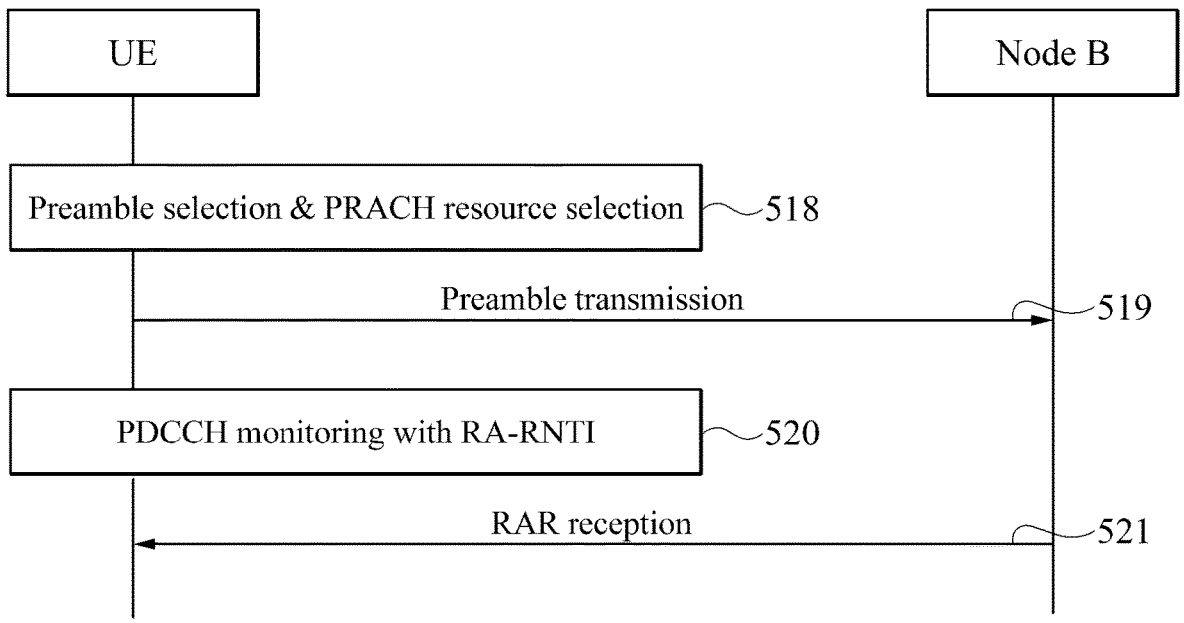
FIG. 5C is a flowchart illustrating random access procedure 2.

In RA procedure 1, UE consider random access procedure is completed successfully upon successful contention resolution FIG. 5C is a flowchart illustrating random access procedure 2.

UE selects preamble to perform random access procedure 518. In the RA procedure 2, dedicate preamble is selected or in other words, UE set the PREAMBLE_INDEX to the ra-PreambleIndex signalled in PDCCH order. UE determine the next available PRACH occasion.

UE transmit the preamble using the selected PRACH and PREAMBLE_INDEX 519.

After transmitting preamble, UE starts the ra-ResponseWindow at the start of the first PDCCH occasion after a fixed duration of n symbols from the end of the preamble transmission 520. UE monitor the PDCCH of the SpCell for Random Access Response(s) identified by the RA-RNTI while the ra-ResponseWindow is running. RA-RNTI is determined in relation with PRACH occasion where preamble was transmitted.

UE receives RAR 521. If a downlink assignment has been received on the PDCCH for the RA-RNTI and the received TB is successfully decoded and if the Random Access Response contains a Random Access Preamble identifier corresponding to the transmitted PREAMBLE_INDEX, UE consider the received RAR is the valid RAR and this Random Access Response reception successful.

In RA procedure 2, UE consider random access procedure is completed successfully upon successful RAR reception.

Figure 5D:
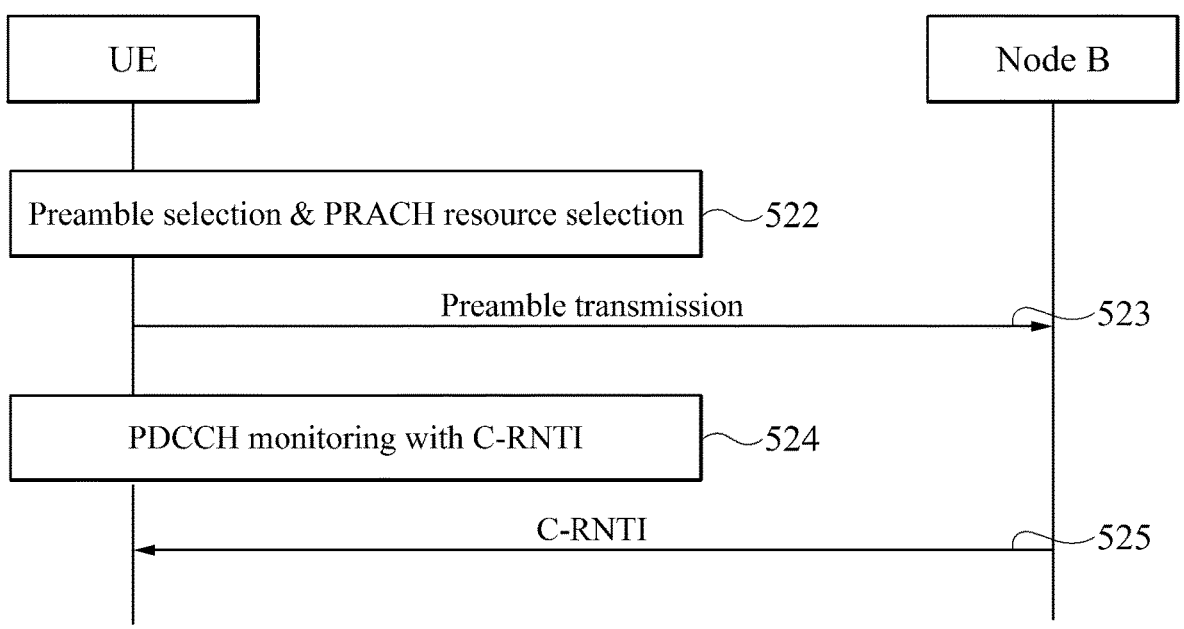
FIG. 5D is a flowchart illustrating random access procedure 3.

FIG. 5D is a flowchart illustrating random access procedure 3.

UE selects preamble to perform random access procedure 522. In the RA procedure 3, dedicate preamble is selected or in other words, UE set the PREAMBLE_INDEX to the signalled ra-PreambleIndex in PDCCH order. UE determine the frequency/time resource for preamble transmission based on the dedicated resource set id received in PDCCH order. UE selects a certain slot/symbol among slots/symbols of the dedicated resource set associated with the best downlink SSB (beam)

UE transmit the preamble using the selected time/frequency resource and PREAMBLE_INDEX 523.

After transmitting preamble, UE starts the bfr-ResponseWindow at the start of the first PDCCH occasion after a fixed duration of m symbols from the end of the preamble transmission. UE monitors the PDCCH of the SpCell to receive PDCCH addressed by C-RNTI while bfr-ResponseWindow is running 524.

If PDCCH addressed by C-RNTI is received, UE consider the random access procedure is completed successfully 525.

Figure 5E:
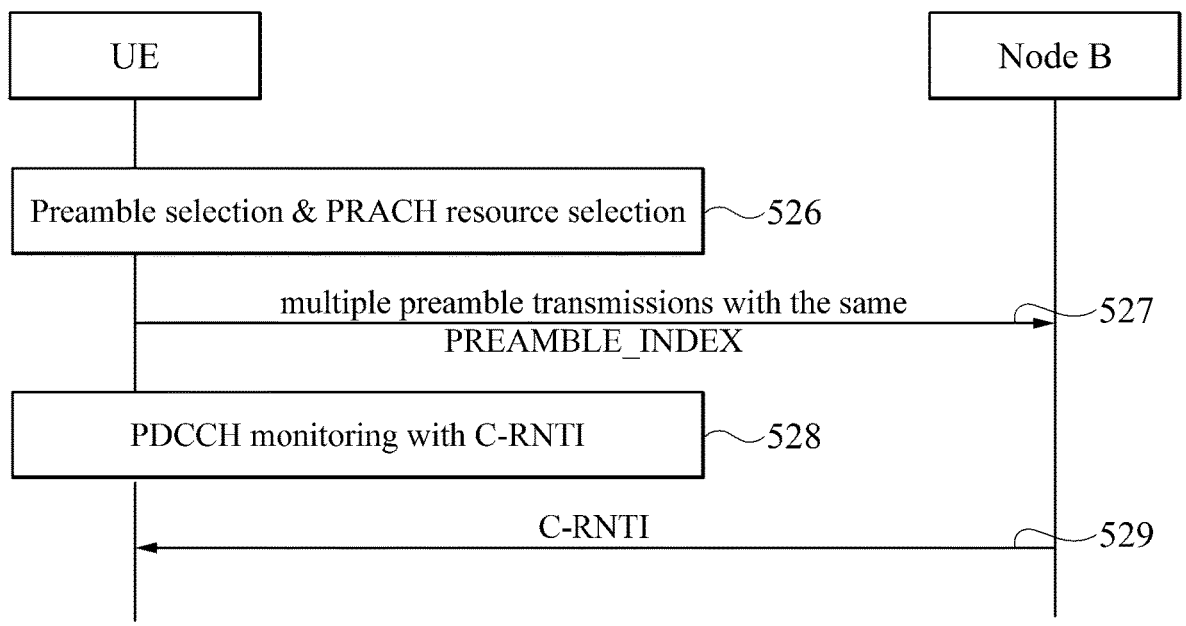
FIG. 5E is a flowchart illustrating random access procedure 4.

FIG. 5E is a flowchart illustrating random access procedure 4.

UE selects preamble to perform random access procedure 526. In the RA procedure 4, dedicate preamble is selected or in other words, UE set the PREAMBLE_INDEX to the signalled ra-PreambleIndex in PDCCH order. UE determine the frequency/time resource for preamble transmission based on the dedicated resource set id received in PDCCH order. UE selects multiple consecutive slots/symbols for multiple preamble transmissions among slots/symbols of the dedicated resource set associated with the best downlink SSB (beam). It is configured in the RRC message how many preamble transmission shall be performed in beam sweeping or beam repetition.

UE transmit the preambles using the selected time/frequency resources and PREAMBLE_INDEX 527.

After transmitting the first preamble, UE starts the bfr-ResponseWindow at the start of the first PDCCH occasion after a fixed duration of m symbols from the end of the preamble transmission. UE monitors the PDCCH of the SpCell to receive PDCCH addressed by C-RNTI while bfr-ResponseWindow is running 528.

If PDCCH addressed by C-RNTI is received, UE consider the random access procedure is completed successfully 529.

Figure 6:
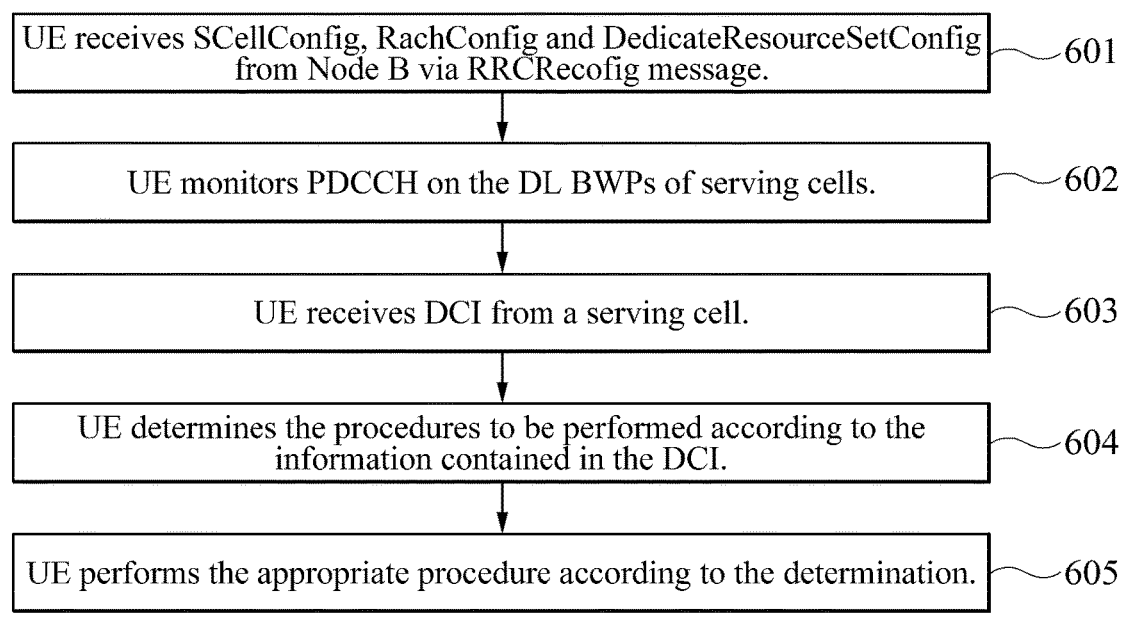
FIG. 6 is a flowchart illustrating UE operation according to the first embodiment.

FIG. 6 is a flowchart illustrating UE operation according to the first embodiment UE receives SCellConfig, RachConfig and DedicateResourceSetConfig from Node B via RRCRecofig message 601.

UE monitors PDCCH on the DL BWPs of serving cells 602.

UE receives DCI from a serving cell 603.

UE determines the procedures to be performed according to the information contained in the DCI 604.

If the DCI is scheduling DCI with specific fields set to specific values, UE trigger RACH procedure 1, RACH procedure 2, RACH procedure 3 or RACH procedure 4. If the DCI is scheduling DCI with the valid resource information, UE performs PUSCH transmission or PDSCH reception accordingly.

UE performs the appropriate procedure according to the determination 605.

$2^{nd}$ Embodiments

In NR, to cope with very high frequency band where NR UE will operate, NR MIMO is expected to be extensively used. For efficient MIMO operation, MIMO resource/states should be quickly adapted. To achieve this, MAC CEs are used to control MIMO resource/states in the active BWPs of activated serving cells. In this disclosure, solutions are provided to enhance the efficiency of MIMO operation when CA/BWP state changes.

Figure 7:
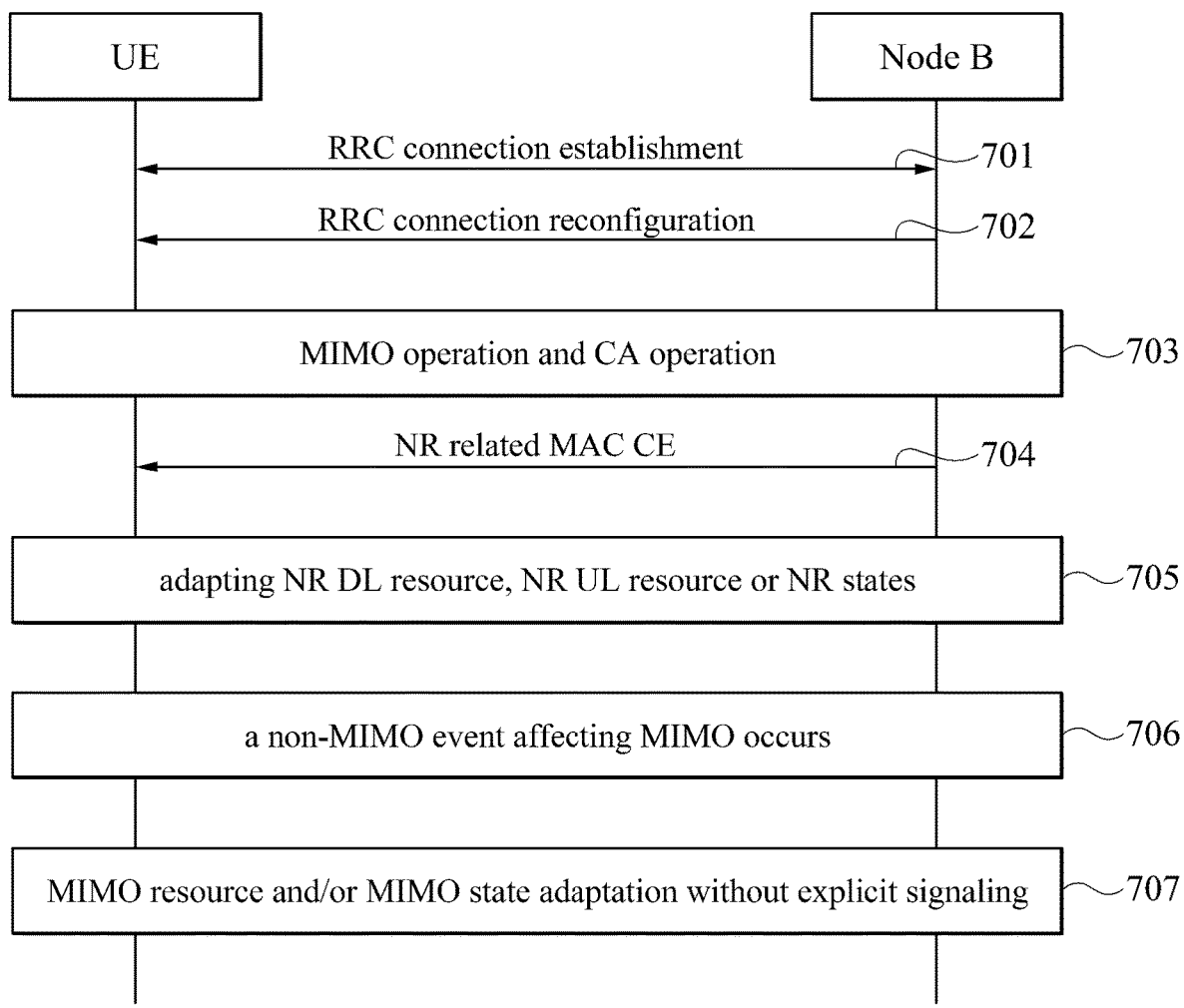
FIG. 7 is a flowchart illustrating MIMO resource control according to the $2^{nd}$ embodiment.

FIG. 7 is a flowchart illustrating MIMO resource control according to the $2^{nd}$ embodiment. FIG. 7 illustrates a non-MIMO event affecting MIMO operation occurs.

UE camps on a NR cell and establishes RRC connection with the GNB controlling the NR cell 701. In the RRC connection establishment procedure, UE and GNB establishes SRB1 to exchange RRC messages. At this point of time, only RRC messages can be received and transmitted. To transmit and receive user traffic like IP packets, DRBs are required which is established in the RRC connection Reconfiguration procedure.

GNB transmits RRCReconfiguration message including NR MIMO resource configurations, NR MIMO states configurations, serving cell configuration etc 702.

GNB and UE performs MIMO operation and CA operation according to the configurations provided by the RRCReconfiguration message 703.

GNB transmits NR MIMO related MAC CE to control either MIMO DL resource, MIMO UL resource or MIMO states 704.

MIMO operation is the operation related to MIMO. MIMO operation includes DL MIMO resource adaptation, UL MIMO resource adaptation or MIMO state change. MIMO operation is triggered when NR MIMO related MAC CE is received.

Non-MIMO operation triggering MIMO operation (hereafter type 1 non-MIMO operation) is the operation that is designed to serves specific purpose that is neither DL MIMO resource adaptation, UL MIMO resource adaptation nor MIMO state change but trigger one of MIMO operation as a side effect.

type 1 non-MIMO operation is triggered:
when A/D MAC CE is received and the MAC CE activates or deactivates at least one serving cell configured for MIMO operation, or
when BWP switches from a BWP to another BWP and at least one of BWPs is configured for MIMO operation.

Non-MIMO operation not triggering MIMO operation (hereafter type 2 non-MIMO operation) is the set of operation that is designed to serve specific purpose that is neither DL MIMO resource adaptation, UL MIMO resource adaptation nor MIMO state change, and not trigger none of MIMO event as a side effect.

type 2 non-MIMO operation is triggered:
when A/D MAC CE is received and the MAC CE activates or deactivates none of serving cell configured for MIMO operation, or
when BWP switches from a BWP to another BWP and none of BWPs is configured for MIMO operation.

"A BWP is configured for MIMO operation" means that either DL MIMO resource, UL MIMO resource or TCI state is configured for the BWP.

"A serving cell is configured for MIMO operation" means that at least one BWP configured for the serving cell is configured for MIMO operation.

MIMO DL resources is either SP ZP CSI-RS Resource Set, SP CSI-RS/CSI-IM Resource set or P (Persistent or periodic) CSI-RS Resource.

MIMO UL resources is either SP CSI reporting on PUCCH or SRS resource set.

MIMO states is either Aperiodic CSI Trigger State or TCI state.

NR MIMO related MAC CE is either SP ZP CSI-RS Resource Set Activation/Deactivation MAC CE, SP CSI-RS/CSI-IM Resource Set Activation/Deactivation MAC CE, SP CSI reporting on PUCCH Activation/Deactivation MAC CE or SP SRS Activation/Deactivation MAC CE.

GNB and UE performs one of MIMO operation (e.g. adapt/adjust the MIMO DL resource, MIMO UL resource or MIMO states) according to the received NR MIMO related MAC CE at specific point of time for a specific BWP of a specific serving cell 705. If MIMO DL resource or MIMO UL resource is instructed for adaptation, the specific point of time is when HARQ ACK for the MAC CE is transmitted. If NR state is instructed for adaptation, the specific point of time is, for UE, when the MAC CE is successfully decoded and, for GNB, when the MAC CE is transmitted.

In this disclosure, 'adapt' and 'adjust' are used interchangeably. Adapting MIMO resource is either suspending, activating, deactivating, releasing or changing MIMO resource type 1 non-MIMO operation is triggered to serving cells 706.

UE and GNB performs appropriate MIMO operation without explicit signaling between UE and GNB 707.

Figure 8:
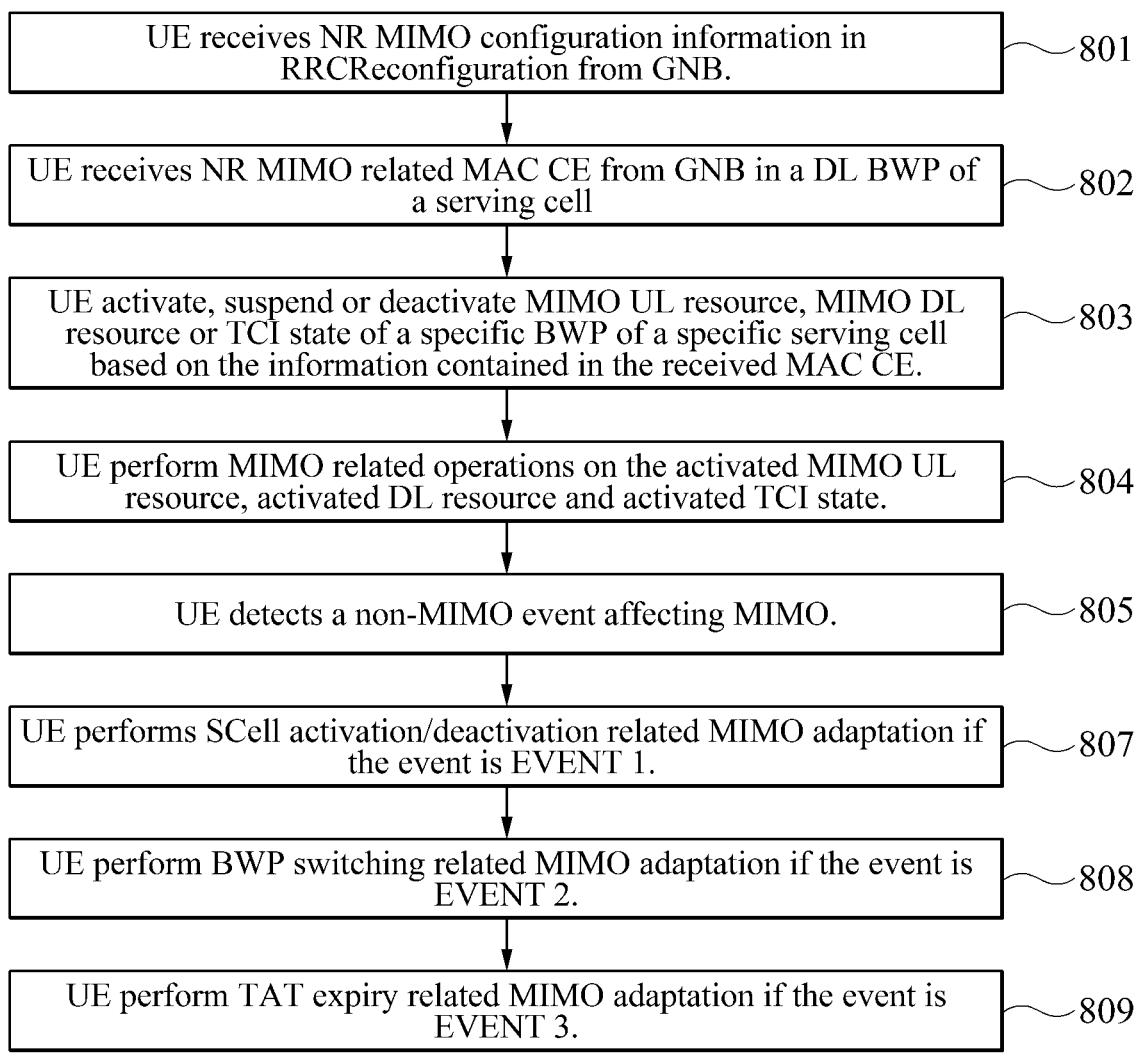
FIG. 8 is a flowchart illustrating UE operation according to the second embodiment.

FIG. 8 is a flowchart illustrating UE operation according to the second embodiment.

UE receives NR MIMO configuration information in RRCReconfiguration from GNB 801.

UE receives NR MIMO related MAC CE from GNB in a DL BWP of a serving cell 802.

UE activate, suspend or deactivate MIMO UL resource, MIMO DL resource or TCI state of a specific BWP of a specific serving cell based on the information contained in the received MAC CE 803. More details are present in FIG. 24.

UE perform the required operations on the activated MIMO UL resource (e.g. transmit MIMO related feedback on the activated UL resource), activated DL resource (e.g. measure MIMO related reference signal on the activated DL resource) and activated TCI state (e.g. apply the activated TCI state) as described in FIG. 9 804.

UE detects that type 1 non-MIMO operation is triggered 805.

Figure 10A:
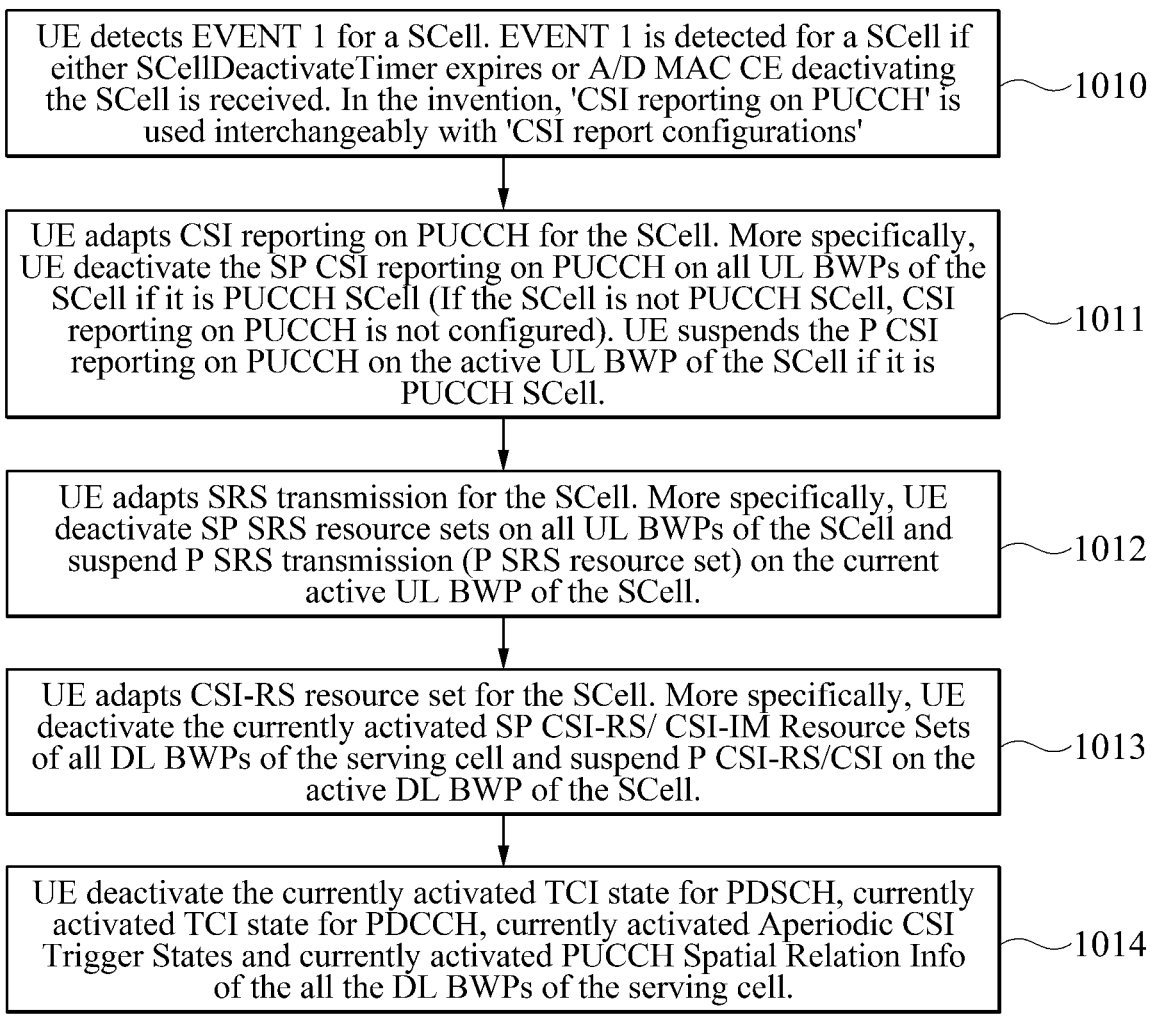
FIG. 10A is a flowchart illustrating UE operation upon detecting EVENT 1.

UE performs appropriate MIMO operation triggered by type 1 non-MIMO operation which is SCell activation/deactivation related MIMO adaptation as in the FIG. 10A if the type 1 non-MIMO operation is triggered by EVENT 1 807.

Figure 10B:
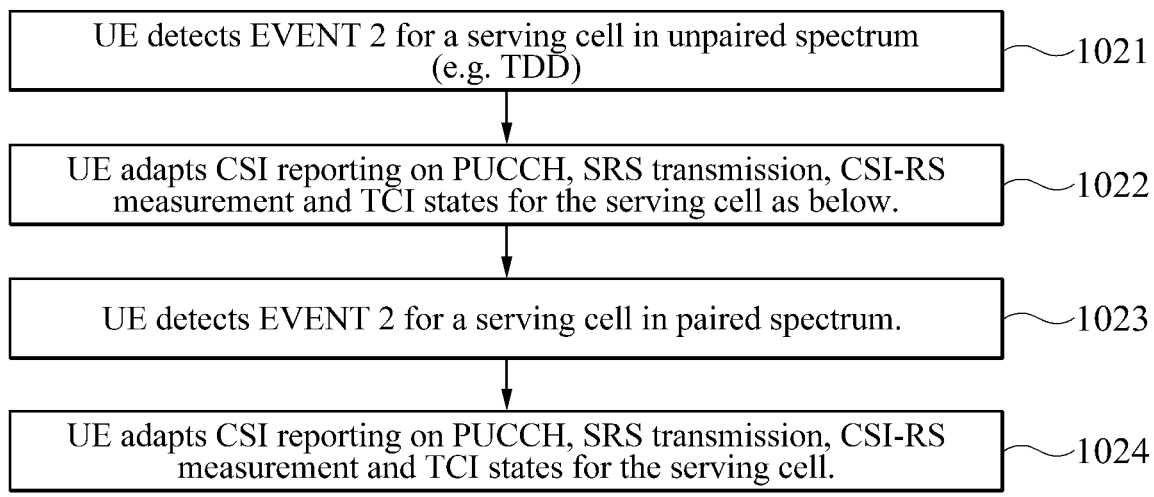
FIG. 10B is a flowchart illustrating UE operation upon detecting EVENT 2.

UE perform appropriate MIMO operation triggered by type 1 non-MIMO operation which is BWP switching related MIMO adaptation as in the FIG. 10B if the type 1 non-MIMO operation is triggered by EVENT 2 808.

Figure 10C:
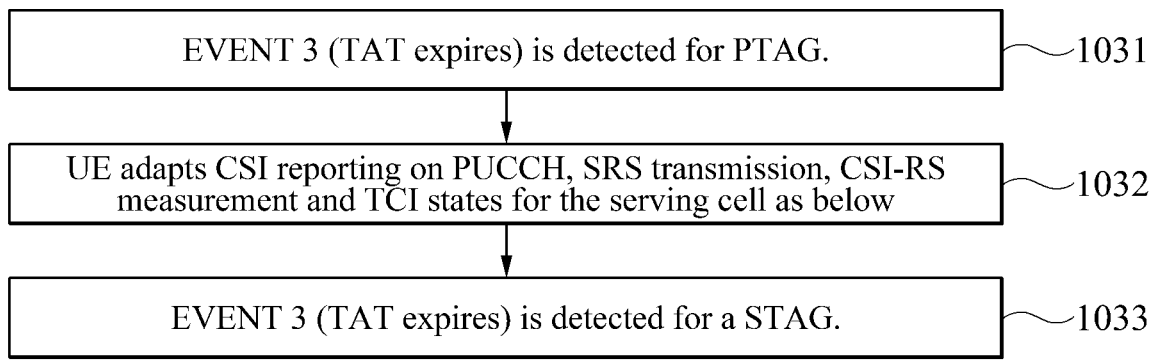
FIG. 10C is a flowchart illustrating UE operation upon detecting EVENT 3.

UE perform appropriate MIMO operation triggered by type 1 non-MIMO operation which is TAT expiry related MIMO adaptation as in the FIG. 10C if the type 1 non-MIMO operation is triggered by EVENT 3 809.

Figure 9A:
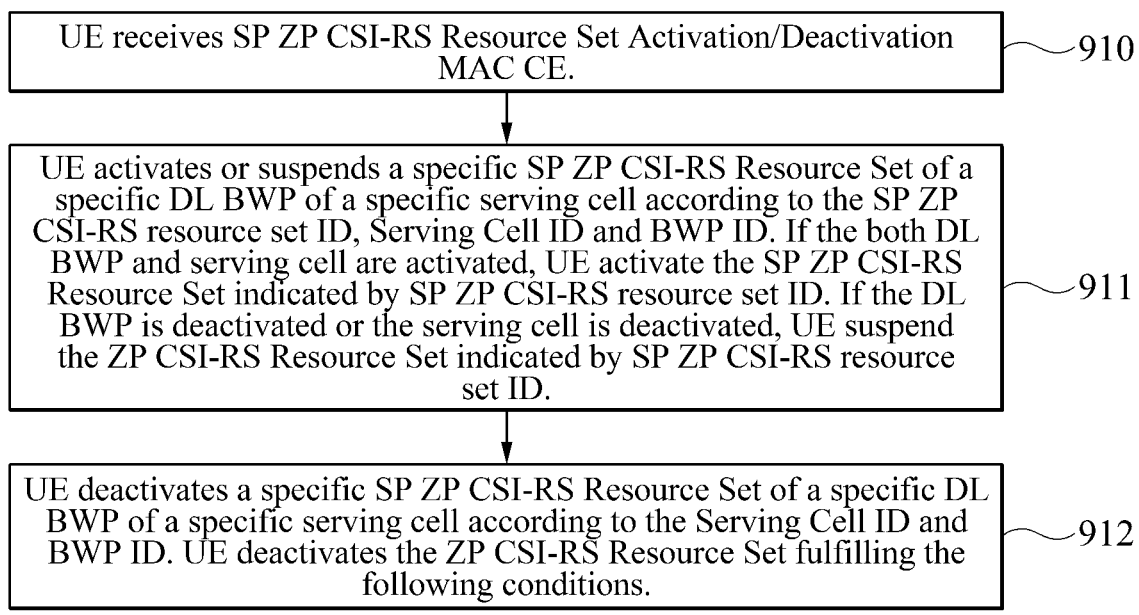
FIG. 9A is a flowchart illustrating UE operation upon receiving SP ZP CSI-RS Resource Set Activation/Deactivation MAC CE.

FIG. 9A is a flowchart illustrating UE operation upon receiving SP ZP CSI-RS Resource Set Activation/Deactivation MAC CE.

UE receives SP ZP CSI-RS Resource Set Activation/Deactivation MAC CE 910.

UE activates or suspends a specific SP ZP CSI-RS Resource Set of a specific DL BWP of a specific serving cell according to the SP ZP CSI-RS resource set ID, Serving Cell ID and BWP ID 911. If the both DL BWP and serving cell are activated (e.g. a DL BWP of activated SCell is activated by the received MAC CE), UE activate the SP ZP CSI-RS Resource Set indicated by SP ZP CSI-RS resource set ID. If the DL BWP is deactivated or the serving cell is deactivated, UE suspend the ZP CSI-RS Resource Set indicated by SP ZP CSI-RS resource set ID. UE deactivates a specific SP ZP CSI-RS Resource Set of a specific DL BWP of a specific serving cell according to the Serving Cell ID and BWP ID 912. UE deactivates the ZP CSI-RS Resource Set fulfilling the following conditions.

The SP ZP CSI-RS Resource Set is configured in the DL BWP of the serving cell indicated by Serving Cell ID and BWP ID.

The SP ZP CSI-RS Resource Set was activated(active)/suspended before/when SP ZP CSI-RS Resource Set Activation/Deactivation MAC CE is received.

Activating ZP CSI-RS Resource Set means UE receives/measures the radio signal in the frequency/time domain defined by the ZP CSI-RS Resource Set.

Suspending ZP CSI-RS Resource Set means UE does not receive/measure the radio signal in the frequency/time domain defined by the ZP CSI-RS Resource Set until resumption event occur and receive/measure the radio signal in the frequency/time domain defined by the ZP CSI-RS Resource Set after resumption event occur. Resumption event is SCell activation (of the corresponding Serving Cell) and/or BWP switching (to the corresponding BWP)

Deactivating ZP CSI-RS Resource Set means UE does not receive/measure the radio signal in the frequency/time domain defined by the ZP CSI-RS Resource Set until resumption event 2 occur and receive/measure the radio signal in the frequency/time domain defined by the ZP CSI-RS Resource Set after resumption event 2 occur. Resumption event 2 occurs when the corresponding ZP CSI-RS Resource Set is explicitly activated by the relevant MAC CE activated while/when the DL BWP is active and the serving cell is active.

Figure 9B:
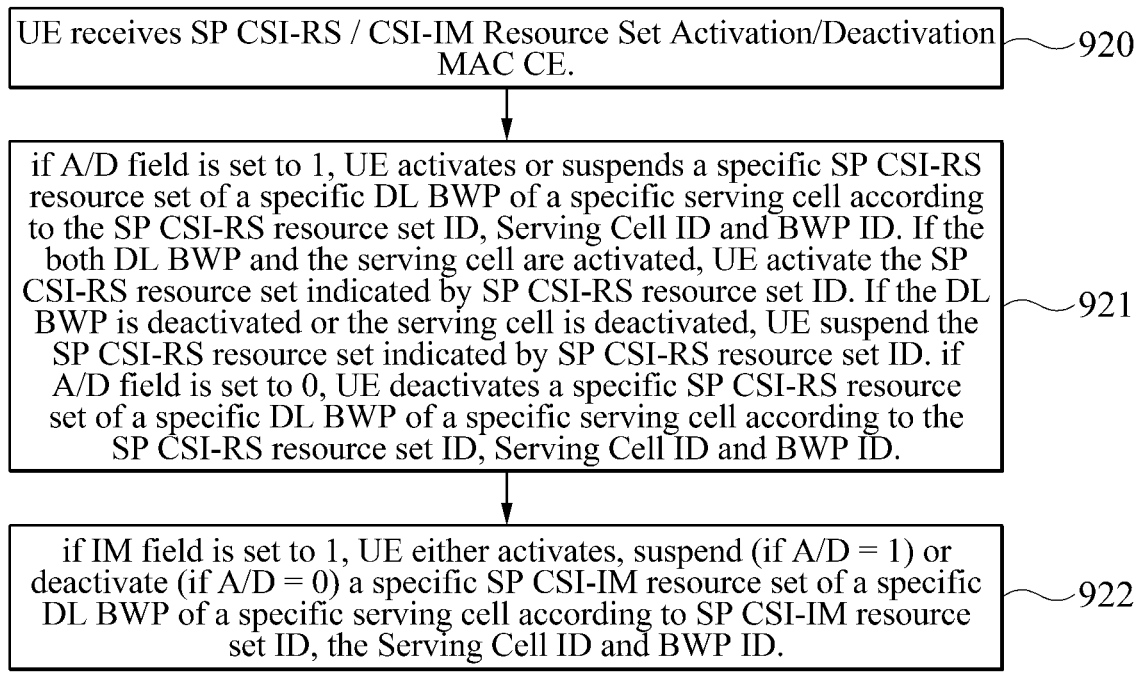
FIG. 9B is a flowchart illustrating UE operation upon receiving SP CSI-RS/CSI-IM Resource Set Activation/Deactivation MAC CE.

FIG. 9B is a flowchart illustrating UE operation upon receiving SP CSI-RS/CSI-IM Resource Set Activation/Deactivation MAC CE.

UE receives SP CSI-RS/CSI-IM Resource Set Activation/Deactivation MAC CE 920.

If A/D field is set to 1, UE activates or suspends a specific SP CSI-RS resource set of a specific DL BWP of a specific serving cell according to the SP CSI-RS resource set ID, Serving Cell ID and BWP ID 921. If the both DL BWP and serving cell are activated (e.g. a DL BWP of activated SCell is activated by the received MAC CE), UE activate the SP CSI-RS resource set indicated by SP CSI-RS resource set ID. If the DL BWP is deactivated or the serving cell is deactivated, UE suspend the SP CSI-RS resource set indicated by SP CSI-RS resource set ID. if A/D field is set to 0, UE deactivates a specific SP CSI-RS resource set of a specific DL BWP of a specific serving cell according to the SP CSI-RS resource set ID, Serving Cell ID and BWP ID.

Activating SP CSI-RS resource set means UE receives/measures the radio signal (e.g. CSI-RS) in the frequency/time domain defined by the SP CSI-RS resource Set.

Suspending SP CSI-RS resource set means UE does not receive/measure the radio signal in the frequency/time domain defined by the SP CSI-RS resource set until resumption event occur and receive/measure the radio signal in the frequency/time domain defined by the SP CSI-RS resource set after resumption event occur.

Deactivating SP CSI-RS resource set means UE does not receive/measure the radio signal in the frequency/time domain defined by the SP CSI-RS resource set until resumption event 2 occur and receive/measure the radio signal in the frequency/time domain defined by the SP CSI-RS resource set after resumption event 2 occur. Resumption event 2 occurs when the corresponding SP CSI-RS Resource Set is activated while/when the DL BWP is active and the serving cell is active.

If IM field is set to 1, UE either activates, suspend (if A/D=1) or deactivate (if A/D=0) a specific SP CSI-IM resource set of a specific DL BWP of a specific serving cell according to SP CSI-IM resource set ID, the Serving Cell ID and BWP ID 922.

Figure 9C:
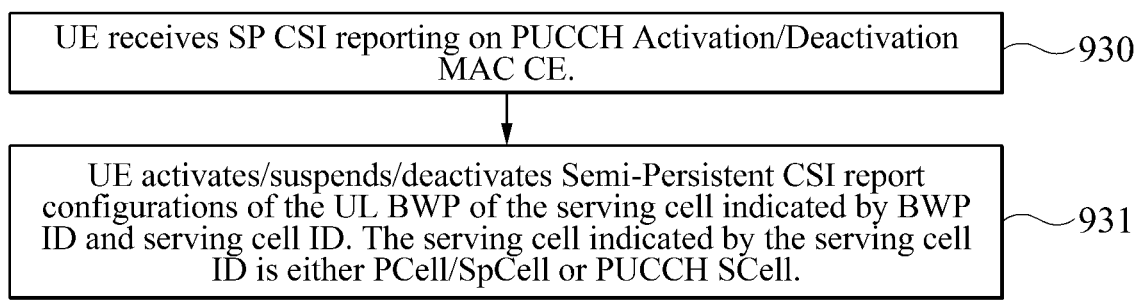
FIG. 9C is a flowchart illustrating UE operation upon receiving SP CSI reporting on PUCCH Activation/Deactivation MAC CE.

FIG. 9C is a flowchart illustrating UE operation upon receiving SP CSI reporting on PUCCH Activation/Deactivation MAC CE.

UE receives SP CSI reporting on PUCCH Activation/Deactivation MAC CE 930.

UE activates/suspends/deactivates Semi-Persistent CSI report configurations of the UL BWP of the serving cell indicated by BWP ID and serving cell ID 931. The serving cell indicated by the serving cell ID is either PCell/SpCell or PUCCH SCell.

If the DL BWP indicated by the BWP ID and the serving cell indicated by the Serving Cell ID are active (activated), UE activates Semi-Persistent CSI report configurations of which corresponding Si is set to 1.

If the DL BWP indicated by the BWP ID is not active (activated) or if the serving cell indicated by the Serving Cell ID is not active (activated), UE suspends Semi-Persistent CSI report configurations of which corresponding Si is set to 1.

UE deactivates Semi-Persistent CSI report configurations of which corresponding Si is set to 0.

Activating SP CSI report configuration means UE transmit CSI report in a specific format on the frequency/time domain. Both the frequency/time domain resource and the format are defined by the SP CSI-RS report configuration.

Suspending SP CSI report configuration means UE does not transmit CSI report in a specific format on the frequency/time domain until resumption event occur and transmit CSI report in a specific format on the frequency/time domain after resumption event occur. Both the frequency/time domain resource and the format are defined by the SP CSI-RS report configuration.

Deactivating SP CSI report configuration means UE does not transmit CSI report in a specific format on the frequency/time domain until resumption event 2 occur and transmit CSI report in a specific format on the frequency/time domain after resumption event 2 occur. Both the frequency/time domain resource and the format are defined by the SP CSI-RS report configuration. Resumption event 2 occurs when the corresponding SP CSI-RS report configuration is explicitly activated by the relevant MAC CE while/when the DL BWP is active and the serving cell is active.

Figure 9D:
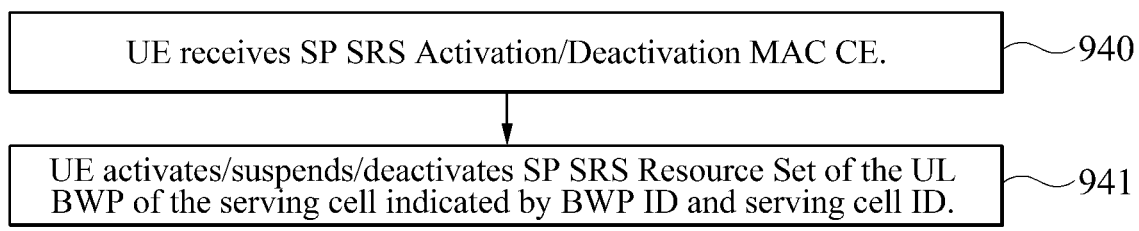
FIG. 9D is a flowchart illustrating UE operation upon receiving SP SRS Activation/Deactivation MAC CE.

FIG. 9D is a flowchart illustrating UE operation upon receiving SP SRS Activation/Deactivation MAC CE.

UE receives SP SRS Activation/Deactivation MAC CE 940.

UE activates/suspends/deactivates SP SRS Resource Set of the UL BWP of the serving cell indicated by BWP ID and serving cell ID 941.

If A/D is set to 1 and if the UL BWP and the serving cell indicated by BWP ID and the Serving Cell ID are both active (activated), UE activates the SP SRS Resource Set indicated by SP SRS Resource Set ID.

If A/D is set to 1 and if the UL BWP or the serving cell indicated by BWP ID and the Serving Cell ID is inactive (deactivated), UE suspends the SP SRS Resource Set indicated by SP SRS Resource Set ID.

If A/D is set to 0, UE deactivates the SP SRS Resource Set indicated by SP SRS Resource Set ID.

Activating SP SRS Resource Set means UE transmit SRS on the frequency/time domain defined by SP SRS Resource Set.

Suspending SP SRS Resource Set means UE does not transmit SRS on the frequency/time domain defined by SP SRS Resource Set until resumption event occur and transmit SRS on the frequency/time domain defined by SP SRS Resource Set after resumption event occur.

Deactivating SP SRS Resource Set means UE does not transmit SRS on the frequency/time domain defined by SP SRS Resource Set until resumption event 2 occur and transmit SRS on the frequency/time domain defined by SP SRS Resource Set after resumption event 2 occur. Resumption event 2 occurs when the corresponding SRS Resource Set is explicitly activated by the relevant MAC CE while/when the DL BWP is active and the serving cell is active.

FIG. 10A is a flowchart illustrating UE operation upon detecting EVENT 1.

UE detects EVENT 1 for a SCell 1010. EVENT 1 is detected for a SCell if either SCellDeactivateTimer expires or A/D MAC CE deactivating the SCell is received. In the disclosure, 'CSI reporting on PUCCH' is used interchangeably with 'CSI report configurations'.

UE adapts CSI reporting on PUCCH for the SCell 1011. More specifically, UE deactivate the SP CSI reporting on PUCCH on all UL BWPs of the SCell if it is PUCCH SCell (If the SCell is not PUCCH SCell, CSI reporting on PUCCH is not configured). UE suspends the P CSI reporting on PUCCH on the active UL BWP of the SCell if it is PUCCH SCell.

UE deactivates the SP CSI reporting on PUCCH on all UL BWPs while suspends the P CSI reporting on PUCCH only on the current active UL BWP. The reason is because P CSI reporting on PUCCH on a UL BWP is suspended when the UL BWP is not active (e.g. UL BWP is switched to the other). Hence there is no need to suspend the other BWPs again upon SCell deactivation. On the other hand, SP CSI reporting on PUCCH on a UL BWP is suspended but not deactivated when the UL BWP is not active.

The reason to suspend the P CSI reporting on PUCCH and to deactivate the SP CSI reporting on PUCCH is because P CSI reporting on PUCCH cannot be deactivated but only either suspended or performed (e.g. activation by MAC CE is not possible).

The reason to suspend SP CSI reporting on PUCCH upon BWP switching and to deactivate SP CSI reporting on PUCCH upon SCell deactivation is because BWP switching occurs in short term (so resuming the reporting without explicit signaling is necessary) while SCell activation/deactivation occurs in longer term.

UE adapts SRS transmission for the SCell 1012. More specifically, UE deactivate SP SRS resource sets on all UL BWPs of the SCell and suspend P SRS transmission (P SRS resource set) on the current active UL BWP of the SCell.

UE adapts CSI-RS resource set for the SCell 1013. More specifically, UE deactivate the currently activated SP CSI-RS/CSI-IM Resource Sets of all DL BWPs of the serving cell and suspend P CSI-RS/CSI on the active DL BWP of the SCell.

UE deactivate the currently activated TCI state for PDSCH, currently activated TCI state for PDCCH, currently activated Aperiodic CSI Trigger States and currently activated PUCCH Spatial Relation Info of the all the DL BWPs of the serving cell 1014.

Suspending CSI reporting on PUCCH (e.g. CSI report configuration) or SRS transmission (e.g. SRS Resource Set) on a UL BWP means followings.
  PUCCH configuration for CSI reporting or SRS configuration for SRS Resource Set of the UL BWP in RRC is kept (not released)
  PUCCH resource for CSI reporting or SRS resource on the UL BWP is kept (not released)
  CSI reporting on PUCCH according to CSI report configuration or SRS transmission according to SRS resource set of the UL BWP is ceased (not performed) until CSI reporting on PUCCH or SRS transmission on the UL BWP is resumed (which is when both the UL BWP and the SCell become active). Hence resuming CSI reporting on PUCCH on a UL BWP is done without receiving the MIMO related MAC CE.

Deactivating CSI reporting on PUCCH (e.g. CSI report configuration) or SRS transmission (e.g. SRS Resource Set) on a UL BWP means followings.
  PUCCH configuration for CSI reporting or SRS configuration for SRS Resource Set of the UL BWP in RRC is kept (not released) as like in suspending case
  PUCCH resource for CSI reporting or SRS resource on the UL BWP is kept (not released) as like in suspending case
  CSI reporting on PUCCH according to CSI report configuration or SRS transmission according to SRS resource set of the UL BWP is ceased (not performed) until CSI reporting on PUCCH or SRS transmission on the UL BWP is explicitly activated by receiving MIMO related MAC CE.

Suspending CSI-RS of a DL BWP means followings.
  csi-RS-ResourceSetList for the DL BWP in RRC is kept (not released)
  Measuring the currently activated CSI-RS resource set of the DL BWP is ceased (not performed) until CSI-RS on the DL BWP is resumed (which is when both the DL BWP and the SCell become active). Hence resuming CSI-RS of a DL BWP is done without receiving the MIMO related MAC CE Deactivating CSI-RS of a DL BWP means followings.
  csi-RS-ResourceSetList for the DL BWP in RRC is kept (not released)
  Measuring the currently activated CSI-RS resource set of the DL BWP is ceased (not performed) until CSI-RS of the DL BWP is explicitly activated by a relevant MAC CE and both the DL BWP and the SCell are activated.

FIG. 10B is a flowchart illustrating UE operation upon detecting EVENT 2.

UE detects EVENT 2 for a serving cell in unpaired spectrum (e.g. TDD) 1021.

UE adapts CSI reporting on PUCCH, SRS transmission, CSI-RS measurement and TCI states for the serving cell as below 1022.
  When DCI/UL grant is received to switch UL BWP from UL BWP x to UL BWP y; or
  When DCI/DL assignment is received to switch DL BWP from DL BWP x to DL BWP y;
    UE suspends both P CSI reporting on PUCCH and SP CSI reporting on PUCCH that are currently active/activated in the UL BWP x (old UL BWP after DCI is received)
    UE resumes both P CSI reporting on PUCCH and SP CSI reporting on PUCCH that has been suspended in the UL BWP y (new UL BWP after DCI is received)
    UE suspends both P SRS resource set and SP SRS resource set that are currently active/activated in the UL BWP x (old UL BWP after DCI is received)
    UE resumes both P SRS resource set and SP SRS resource set that has been suspended in the UL BWP y (new UL BWP after DCI is received)
    UE suspends activated SP CSI-RS configuration of the DL BWP x
    UE resumes SP CSI-RS configuration that has been suspended in the DL BWP y
    UE suspends the activated TCI state for PDSCH and TCI state for PDCCH of the DL BWP x
    UE resumes the activated TCI state for PDSCH and TCI state for PDCCH of the DL BWP y UE detects EVENT 2 for a serving cell in paired spectrum (e.g. FDD) 1023.

UE adapts CSI reporting on PUCCH, SRS transmission, CSI-RS measurement and TCI states for the serving cell as below 1024.

When DCI/UL grant is received to switch UL BWP from UL BWP x to UL BWP y; or

UE suspends both P CSI reporting on PUCCH and SP CSI reporting on PUCCH that are currently active/activated in the UL BWP x (old UL BWP after DCI is received)

UE resumes both P CSI reporting on PUCCH and SP CSI reporting on PUCCH that has been suspended in the UL BWP y (new UL BWP after DCI is received)

UE suspends both P SRS resource set and SP SRS resource set that are currently active/activated in the UL BWP x (old UL BWP after DCI is received)

UE resumes both P SRS resource set and SP SRS resource set that has been suspended in the UL BWP y (new UL BWP after DCI is received)

When DCI/DL assignment is received to switch DL BWP from DL BWP x to DL BWP y;

UE suspends activated SP CSI-RS configuration of the DL BWP x

UE resumes SP CSI-RS configuration that has been suspended in the DL BWP y

UE suspends the activated TCI state for PDSCH and TCI state for PDCCH of the DL BWP x UE resumes the activated TCI state for PDSCH and TCI state for PDCCH of the DL BWP y FIG. 10C is a flowchart illustrating UE operation upon detecting EVENT 3.

EVENT 3 (TAT expires) is detected for PTAG 1031.

UE adapts CSI reporting on PUCCH, SRS transmission, CSI-RS measurement and TCI states for the serving cell as below 1032.

UE deactivates the SP CSI reporting on PUCCH on the all UL BWPs of SpCell and of PUCCH SCell of all TAGs UE release P CSI reporting on PUCCH (release RRC configuration and PUCCH resource, P CSI reporting configurations) on the all UL BWPs of SpCell and of PUCCH SCell of all TAGs UE deactivate the SP SRS resource sets on the all UL BWPs of all serving cells of all TAGs.

UE release the P SRS resources sets (release the RRC configuration and SRS resource) on the all UL BWPs of all serving cells of all TAGs.

EVENT 3 (TAT expires) is detected for a STAG 1033.

UE deactivates the SP CSI reporting on PUCCH on the all UL BWPs of PUCCH SCell of the STAG.

UE release P CSI reporting on PUCCH (release RRC configuration and PUCCH resource; P CSI reporting configurations) on the all UL BWPs of PUCCH SCell of the STAG UE deactivate the SP SRS resource sets on the all UL BWPs of all serving cells of the STAG.

UE release the P SRS resources sets on the all UL BWPs of all serving cells of the STAG.

Releasing CSI reporting configurations mean UE release/delete CSI reporting configurations having received by RRC message. Released CSI reporting configurations can not be resumed nor activated again.

Hereinafter MIMO related MAC CEs, terminologies and general procedures that might help readers to understand the disclosure are further explained.

For MIMO to operate efficiently, CSI-RS, CSI-RS reporting, SRS, reporting states and spatial relation states shall be properly configured and dynamically adjusted.

MIMO related resources like CSI-RS, CSI-RS reporting and SRS are classified as 3 types. Periodic/Persistent ones, Semi-Persistent ones and dynamic ones. In this disclosure, Periodic/Persistent ones are denoted by 'P'. Semi-Persistent ones are denote by 'SP'. Dynamic ones are denoted by 'D'.

P NZP CSI-RS Resource Set and P CSI-RS/CSI-IM Resource Set are configured per DL BWP per serving cell by RRC and the initial state when configured by RRC is either activated (if the corresponding BWP and serving cells are active/activated) or suspended (if the corresponding BWP is deactivated or the corresponding serving cell is deactivated).

SP NZP CSI-RS Resource Sets and SP CSI-RS/CSI-IM Resource Sets are configured per DL BWP per serving cell by RRC and the initial state when configured by RRC are deactivated. One of the resource set is activated or suspended later by SP ZP CSI-RS Resource Set Activation/Deactivation MAC CE.

The definition of ZP CSI-RS Resource Set and the corresponding RRC configurations are in 38.211, 38.212, 38.213 and 38.331.

P CSI-RS/CSI-IM Resource Set is configured per DL BWP per serving cell by RRC and the initial state when configured by RRC is either activated (if the corresponding BWP and serving cells are active/activated) or suspended (if the corresponding BWP is deactivated or the corresponding serving cell is deactivated).

SP CSI-RS/CSI-IM Resource Sets are configured per DL BWP per serving cell by RRC and the initial state when configured by RRC are deactivated. One of the resource sets is activated or suspended later by SP CSI-RS/CSI-IM Resource Set Activation/Deactivation MAC CE.

The definition of CSI-RS/CSI-IM Resource Set and the corresponding RRC configurations are in 38.211, 38.212, 38.213 and 38.331.

P SRS Resource Set is configured per UL BWP per serving cell by RRC and the initial state when configured by RRC is either activated (if the corresponding BWP and serving cells are active/activated) or suspended (if the corresponding BWP is deactivated or the corresponding serving cell is deactivated).

SP SRS Resource Set Resource Sets are configured per UL BWP per serving cell by RRC and the initial state when configured by RRC are deactivated. One of the resource sets is activated or suspended later by SP SRS Activation/Deactivation MAC CE.

The definition of SRS Resource Set and the corresponding RRC configurations are in 38.211, 38.212, 38.213 and 38.331.

P CSI report configuration is configured per UL BWP of PCell/SpCell by RRC and the initial state when configured by RRC is either activated (if the corresponding BWP is active/activated) or suspended (if the corresponding BWP is deactivated).

SP CSI report configurations are configured per UL BWP of PCell/SpCell by RRC and the initial state when configured by RRC are deactivated. One of the report configurations is activated or suspended later by SP CSI reporting on PUCCH Activation/Deactivation MAC CE.

The definition of CSI report configuration (and of CSI reporting on PUCCH) and the corresponding RRC configurations are in 38.211, 38.212, 38.213 and 38.331.

A DL BWP being activated for a UE means the DL BWP is used for DL receptions/activities (e.g. PDSCH, PDCCH, CSI-RS reception) for the UE.

A UL BWP being activated for a UE means the UL BWP is used for UL transmissions/activities (e.g. PUSCH, PUCCH, RACH) for the UE.

MIMO DL Resource Related MAC CEs

TABLE 1

| Name | Description |
|---|---|
| SP ZP CSI-RS Resource Set Activation/Deactivation MAC CE | The network may activate and deactivate the configured Semi-persistent ZP CSI-RS resource set of a Serving Cell by sending the SP ZP CSI-RS Resource Set Activation/Deactivation MAC CE described in subclause 6.1.3.L. The configured Semi-persistent ZP CSI-RS resource sets are initially deactivated upon configuration and after a handover. |
| SP CSI-RS/CSI-IM Resource Set Activation/Deactivation MAC CE | The network may activate and deactivate the configured Semi-persistent CSI-RS/CSI-IM resource sets of a Serving Cell by sending the SP CSI-RS/CSI-IM Resource Set Activation/Deactivation MAC CE described in subclause 6.1.3.X. The configured Semi-persistent CSI-RS/CSI-IM resource sets are initially deactivated upon configuration and after a handover. |

SP CSI-RS/CSI-IM Resource Set Activation/Deactivation MAC CE

The SP CSI-RS/CSI-IM Resource Set Activation/Deactivation MAC CE is identified by a MAC PDU subheader with LCID as specified in Table 6.2.1-1 of TS 38.321. It has a variable size and consists of the following fields as illustrated in FIG. 13A:

A/D: This field indicates whether the MAC CE is used to activate or deactivate indicated SP CSI-RS and CSI-IM resource set(s). The field is set to "1" to indicate activation, otherwise it indicates deactivation;

Serving Cell ID: This field indicates the identity of the Serving Cell for which the MAC CE applies. The length of the field is 5 bits;

BWP ID: This field contains BWP-Id, as specified in TS 38.331 [8], of a downlink bandwidth part for which the MAC CE applies. The length of the BWP ID field is 2 bits;

SP CSI-RS resource set ID: This field contains an index of csi-RS-ResourceSetList containing Semi Persistent NZP CSI-RS resource sets, as specified in TS 38.331 [8], indicating the Semi Persistent NZP CSI-RS resource set, which should be activated or deactivated. The length of the field is 4 bits;

IM: This field indicates whether SP CSI-IM resource set indicated with SP CSI-IM resource set ID field should be activated/deactivated. If IM field is set to "1", SP CSI-IM resource set should be activated or deactivated (depending on A/D field setting). If IM field is set to "0", the octet containing SP CSI-IM resource set ID field is not present;

SP CSI-IM resource set ID: This field contains an index of csi-RS-ResourceSetList containing Semi Persistent CSI-IM resource sets, as specified in TS 38.331 [8], indicating the Semi Persistent CSI-IM resource set, which should be activated or deactivated. The length of the field is 4 bits;

TCI State IDi: This field contains TCI-StateId, as specified in TS 38.331 [8], of a TCI State, which is used as QCL source for the resource within the Semi Persistent NZP CSI-RS resource set indicated by SP CSI-RS resource set ID field. TCI State ID0 indicates TCI State for the first resource within the set, TCI State ID1 for the second one and so on. The length of the field is 6 bits. If A/D field is set to "0" then the octet containing this field is not present;

R: Reserved bit, set to "0".

SP ZP CSI-RS Resource Set Relation Activation/Deactivation MAC CE

The SP ZP CSI-RS Resource Set relation Activation/Deactivation MAC CE is identified by a MAC PDU subheader with LCID as specified in Table 6.2.1-1. It has a fixed size of 16 bits with following fields as illustrated in FIG. 13B:

Serving Cell ID: This field indicates the identity of the Serving Cell for which the MAC CE applies. The length of the field is 5 bits;

BWP ID: This field contains BWP-Id, as specified in TS 38.331 [8], of a downlink bandwidth part for which the MAC CE applies. The length of the BWP ID field is 2 bits;

SP ZP CSI-RS resource set ID: This field contains an index of sp-ZP-CSI-RS-ResourceSetsToAddModList, as specified in TS 38.331 [8], indicating the Semi Persistent ZP CSI-RS resource set, which should be activated (if the first R bit is 1) or deactivated (if the first R bit is 0). The length of the field is 4 bits;

R: Reserved bit, set to "0".

The first R bit can be used as A/D field. RRC can configure whether the first R bit is A/D bit or not. If the first R bit is not A/D field, it is always activation MAC CE.

MIMO UL Resource Related MAC CEs

TABLE 2

| Name | Description |
|---|---|
| SP SRS Activation/Deactivation MAC CE | The network may activate and deactivate the configured Semi-persistent SRS resource sets of a Serving Cell by sending the SP SRS Activation/Deactivation MAC CE described in subclause 6.1.3.R. The configured Semi-persistent SRS resource sets are initially deactivated upon configuration and after a handover. |

TABLE 2-continued

| Name | Description |
| --- | --- |
| SP CSI reporting on PUCCH Activation/Deactivation MAC CE | The network may activate and deactivate the configured Semi-persistent CSI reporting on PUCCH of a Serving Cell by sending the SP CSI reporting on PUCCH Activation/Deactivation MAC CE described in subclause 6.1.3.E. The configured Semi-persistent CSI reporting on PUCCH is initially deactivated upon configuration and after a handover. |

SP CSI Reporting on PUCCH Activation/Deactivation MAC CE

The SP CSI reporting on PUCCH Activation/Deactivation MAC CE is identified by a MAC PDU subheader with LCID as specified in Table 6.2.1-1. It has a fixed size of 16 bits with following fields as illustrated in FIG. 13C:

- Serving Cell ID: This field indicates the identity of the Serving Cell for which the MAC CE applies. The length of the field is 5 bits;
- BWP ID: This field contains BWP-Id, as specified in TS 38.331 [8], of a downlink bandwidth part for which the MAC CE applies. The length of the BWP ID field is 2 bits;
- Si: This field indicates the activation/deactivation status of the Semi-Persistent CSI report configuration within csi-ReportConfigToAddModList of the BWP indicated by BWP ID of the serving cell indicated by Serving cell ID, as specified in TS 38.331 [8]. S0 refers to the first report configuration within the list with type set to "semiPersistentOnPUCCH", S1 to the second report configuration within the list with type set to "semiPersistentOnPUCCH" and so on. The Si field is set to "1" to indicate that the Semi-Persistent CSI report configuration i shall be activated. The Si field is set to "0" to indicate that the Semi-Persistent CSI report configuration i shall be deactivated. If there is no Semi-Persistent CSI report configuration i within the list, MAC entity shall ignore this field;
- R: Reserved bit, set to "0".

SP SRS Activation/Deactivation MAC CE

The SP SRS Activation/Deactivation MAC CE is identified by a MAC PDU subheader with LCID as specified in Table 6.2.1-1. It has a variable size with following fields as illustrated in FIG. 13D:

- A/D: This field indicates whether the MAC CE is used to activate or deactivate indicated SP SRS resource set. The field is set to "1" to indicate activation, otherwise it indicates deactivation;
- Serving Cell ID: This field indicates the identity of the Serving Cell for which the MAC CE applies. The length of the field is 5 bits;
- BWP ID: This field contains BWP-Id, as specified in TS 38.331 [8], of an uplink bandwidth part for which the MAC CE applies. The length of the BWP ID field is 2 bits;
- SUL: This field indicates whether the MAC CE applies to the NUL carrier or SUL carrier configuration. This field is set to "1" to indicate it applies to the SUL carrier configuration, it is set to "0" to indicate it applies to the NUL carrier configuration; If the serving cell indicated by Serving Cell ID is not configured with SUL, this field is always set to 0.
- SP SRS Resource Set ID: This field indicates the SP SRS Resource Set ID identified by SRS-ResourceSetId as specified in TS 38.331 [8], which is to be activated or deactivated. The length of the field is 4 bits;
- Fi: This field indicates the type of a resource used as a spatial relationship for SRS resource within SP SRS Resource Set indicated with SP SRS Resource Set ID field. F0 refers to the first SRS resource within the resource set, F1 to the second one and so on. The field is set to "1" to indicate NZP CSI-RS resource index is used, it is set to "0" to indicate either SSB index or SRS resource index is used. The length of the field is 1 bit. This field is only present if MAC CE is used for activation, e.g. A/D field is set to "1";
- Resource IDi: This field contains an identifier of the resource used for spatial relationship derivation for SRS resource i. Resource ID0 refers to the first SRS resource within the resource set, Resource ID1 to the second one and so on. If Fi is set to "0" and the first bit of this field is set to "1", then the remainder of this field contains SSB-Index as specified in TS 38.331 [8], if Fi is set to "0" and the first bit of this field is set to "0" then the remainder this field contains SRS-ResourceId as specified in TS 38.331 [8]. The length of the field is 7 bits. This field is only present if MAC CE is used for activation, e.g. A/D field is set to "1";
- R: Reserved bit, set to "0".

MIMO States Related MAC CEs

TABLE 3

| Name | Description |
| --- | --- |
| Aperiodic CSI Trigger State Subselection MAC CE | The network may select among the configured aperiodic CSI trigger states of a Serving Cell by sending the Aperiodic CSI Trigger State Subselection MAC CE |
| TCI States Activation/Deactivation for UE-specific PDSCH MAC CE | The network may activate and deactivate the configured TCI states for PDSCH of a Serving Cell by sending the TCI States Activation/Deactivation for UE-specific PDSCH MAC CE described in subclause 6.1.3.Z. The configured TCI states for PDSCH are initially deactivated upon configuration and after a handover. |
| TCI State Indication for UE-specific PDCCH MAC CE | The network may indicate a TCI state for PDCCH reception for a CORESET of a Serving Cell by sending the TCI State Indication for UE-specific PDCCH MAC CE described in subclause 6.1.3.Q. |
| PUCCH spatial relation Activation/Deactivation | The network may activate and deactivate a spatial relation for a PUCCH resource of a Serving Cell by sending the PUCCH spatial |

TABLE 3-continued

| Name | Description |
| --- | --- |
| MAC CE | relation Activation/Deactivation MAC CE described in subclause 6.1.3.S. |

Aperiodic CSI Trigger State Subselection MAC CE

The Aperiodic CSI Trigger State Subselection MAC CE is identified by a MAC PDU subheader with LCID as specified in Table 6.2.1-1. It has a variable size consisting of following fields as illustrated in FIG. 13E:

Serving Cell ID: This field indicates the identity of the Serving Cell for which the MAC CE applies. The length of the field is 5 bits;

BWP ID: This field contains BWP-Id, as specified in TS 38.331 [8], of a downlink bandwidth part for which the MAC CE applies. The length of the BWP ID field is 2 bits;

Ti: This field indicates the selection status of the Aperiodic Trigger States configured within CSI-aperiodic-TriggerStateList (of the BWP of the serving cell indicated by the BWP ID and Serving Cell ID), as specified in TS 38.331 [8]. $T_0$ refers to the first trigger state within the list, $T_1$ to the second one and so on. If the list does not contain entry with index I, MAC entity shall ignore the $T_i$ field. The $T_i$ field is set to "1" to indicate that the Aperiodic Trigger State i shall be mapped to the codepoint of the DCI CSI request field, as specified in TS 38.214 [7]. The codepoint to which the Aperiodic Trigger State is mapped is determined by its ordinal position among all the Aperiodic Trigger States with $T_i$ field set to "1", e.g. the first Aperiodic Trigger State with $T_i$ field set to "1" shall be mapped to the codepoint value 1, second Aperiodic Trigger State with Ti field set to "1" shall be mapped to the codepoint value 2 and so on. The maximum number of mapped Aperiodic Trigger States is 63;

R: Reserved bit, set to "0".

TCI States Activation/Deactivation for UE-Specific PDSCH MAC CE

The TCI States Activation/Deactivation for UE-specific PDSCH MAC CE is identified by a MAC PDU subheader with LCID as specified in Table 6.2.1-1. It has a variable size consisting of following fields as illustrated in FIG. 13F:

Serving Cell ID: This field indicates the identity of the Serving Cell for which the MAC CE applies. The length of the field is 5 bits;

BWP ID: This field contains BWP-Id, as specified in TS 38.331 [8], of a downlink bandwidth part for which the MAC CE applies. The length of the BWP ID field is 2 bits;

Ti: If there is a TCI state with TCI-StateId i as specified in TS 38.331 [8], this field indicates the activation/deactivation status of the TCI state with TCI-StateId i, otherwise MAC entity shall ignore the Ti field. The Ti field is set to "1" to indicate that the TCI state with TCI-StateId i shall be activated and mapped to the codepoint of the DCI Transmission Configuration Indication field, as specified in TS 38.214 [7]. The Ti field is set to "0" to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to "1", e.g. the first TCI State with Ti field set to "1" shall be mapped to the codepoint value 1, second TCI State with Ti field set to "1" shall be mapped to the codepoint value 2 and so on. The maximum number of activated TCI states is 8;

R: Reserved bit, set to "0".

TCI State Indication for UE-Specific PDCCH MAC CE

Figure 13G:
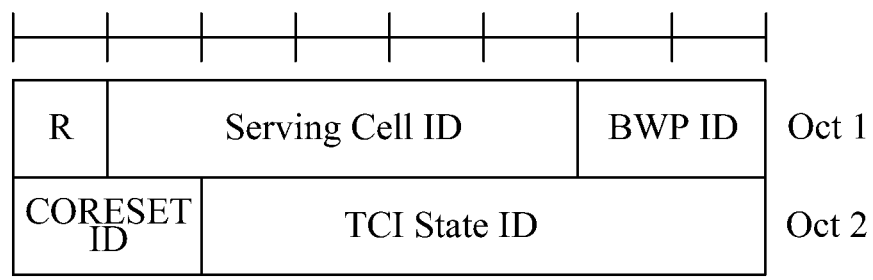

The TCI State Indication for UE-specific PDCCH MAC CE is identified by a MAC PDU subheader with LCID as specified in Table 6.2.1-1. It has a fixed size of 16 bits with following fields as illustrated in FIG. 13G:

Serving Cell ID: This field indicates the identity of the Serving Cell for which the MAC CE applies. The length of the field is 5 bits;

BWP ID: This field contains BWP-Id, as specified in TS 38.331 [8], of a downlink bandwidth part for which the MAC CE applies. The length of the BWP ID field is 2 bits;

CORESET ID: This field indicates a Control Resource Set identified with ControlResourceSetId as specified in TS 38.331 [8], for which the TCI State is being indicated. The length of the field is 2 bits;

TCI State ID: This field indicates the TCI state identified by TCI-StateId as specified in TS 38.331 [8] applicable to the Control Resource Set identified by CORESET ID field. The length of the field is 6 bits;

R: Reserved bit, set to "0".

PUCCH Spatial Relation Activation/Deactivation MAC CE

Figure 13H:
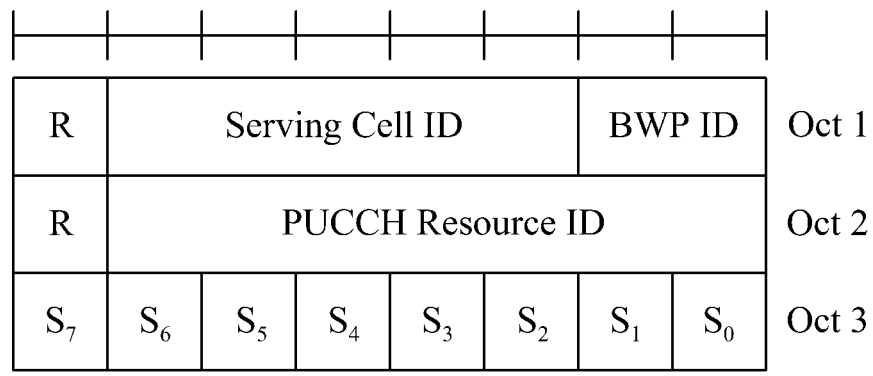

The PUCCH spatial relation Activation/Deactivation MAC CE is identified by a MAC PDU subheader with LCID as specified in Table 6.2.1-1. It has a fixed size of 24 bits with following fields as illustrated in FIG. 13H:

Serving Cell ID: This field indicates the identity of the Serving Cell for which the MAC CE applies. The length of the field is 5 bits;

BWP ID: This field contains BWP-Id, as specified in TS 38.331 [8], of an uplink bandwidth part for which the MAC CE applies. The length of the BWP ID field is 2 bits;

PUCCH Resource ID: This field contains an identifier of the PUCCH resource ID identified by PUCCH-ResourceId as specified in TS 38.331 [8]. The length of the field is 7 bits;

Si: If there is a PUCCH Spatial Relation Info with PUCCH-SpatialRelationInfoId i as specified in TS 38.331 [8], configured for the uplink bandwidth part indicated by BWP ID field, Si indicates the activation status of PUCCH Spatial Relation Info with PUCCH-SpatialRelationInfoId i, otherwise MAC entity shall ignore this field. The Si field is set to "1" to indicate PUCCH Spatial Relation Info with PUCCH-SpatialRelationInfoId i should be activated. The Si field is set to "0" to indicate PUCCH Spatial Relation Info with PUCCH-SpatialRelationInfoId i should be deactivated. Only a single PUCCH Spatial Relation Info can be active for a PUCCH Resource at a time;

R: Reserved bit, set to "0".

Hereinafter RRC messages, terminologies and general procedures that might help readers to understand the disclosure are further explained.

System Information consists of MIB, SIB1, SIB2 and other SIBs.

MIB includes following information: SFN, SCS (sub carrier spacing) for random access and RMSI etc.

SIB1 includes following information: scheduling information for SIBG/SI, value tags for SIBs, Frequency Band Indicator etc. A value tag is indicated for each SIB (except MIB, SIB1 and SIB2). UE determines whether it need to request SIB or not based on the value tag. If the value tag of SIB x indicated in SIB 1 of the serving cell is different from the value tag of SIB x UE currently stores, UE considers SIB x for SI request.

Instead of transmitting individual SIB at a time, a group of SIBs (SIB group or SIBG) is transmitted. SIBG (which can be simply called SI) is used to convey one or more system information blocks. All the SIBs included in a SIBG are transmitted with the same periodicity. SIBG/SI scheduling information includes the periodicity information. The information regarding which SIBG/SI convey which SIBs are also included in SIBG/SI scheduling information.

SIB2 contains radio resource configuration information that is common for all UEs. It includes following information: RACH configuration information, paging configuration information, PDSCH configuration information, PUSCH configuration information etc.

MIB and SIB1 are classified as MSI (Minimum System Information) and transmitted periodically in the predefined frequency location at the predefined time occasion.

SIB 2 is classified as RMSI (Remaining Minimum System Information) and transmitted periodically in the frequency location at the time occasion indicated in MSI.

Other SIBs are classified as OSI (Other System Information) and transmitted when UE request.

BWP is the abbreviation of Bandwidth part. It is introduced to make it possible that a single cell can serve different types of UEs having different bandwidth capabilities.

Figure 11:
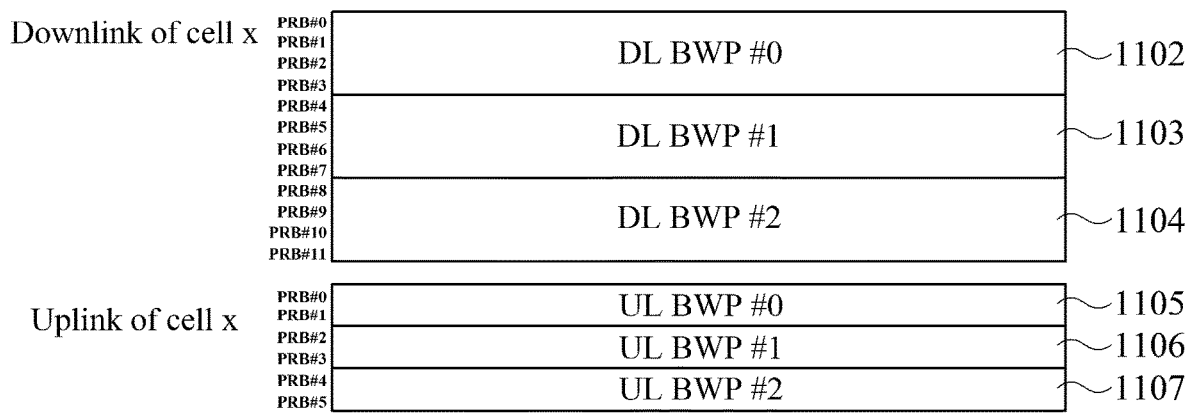
FIG. 11 is a diagram illustrating BWP in a mobile communication system.

In NR, a cell can consist of one or more than one BWPs. BWP is the group of contiguous PRBs. For example, as described in FIG. 11, cell x consists of 3 DL BWPs and 3 UL BWPs. DL BWP #0 1102 consists of PRB #0~PRB #3. DL BWP #1 1103 consists of PRB #4~PRB #7. DL BWP #2 1104 consists of PRB #8~PRB #11. UL BWP #0 1105 consists of PRB #0~PRB #1. UL BWP #1 1106 consists of PRB #2~PRB #3. UL BWP #2 1107 consists of PRB #4~PRB #5.

UE can be configured with multiple BWPs of a serving cell via RRC signaling. In UE perspective, configured BWP can be either in activated state or in deactivated state. Only one BWP can be in activated state for a UE.

Activation/deactivation of BWP can be controlled by DCI. For example, if UE with the DL BWP #0 being currently activated receives DCI scheduling DL PRB of other BWP (e.g. PRB #4), then activated DL BWP of the UE changes from DL BWP #0 to the other DL BWP (DL BWP #1 in this case). Likewise, if UE with the UL BWP #0 being currently activated receive DCI scheduling UL PRB of other BWP (e.g. PRB #4), then activated UL BWP of the UE changes from UL BWP #0 to the other UL BWP (UL BWP #2 in this case).

In FDD, DL BWP and UL BWP are switched independently e.g. when DL BWP #0 and UL BWP #0 are the activated BWPs for the UE at a certain point of time, activated DL BWP can be switched to e.g. DL BWP #2 while activated UL BWP is kept same.

In TDD and for limited capability UEs, switching DL BWP and UL BWP together is more beneficial. In TDD, DL and UL are used in the same frequency region, hence if DL BWP and UL BWP does not change together, UE may be required to change its RF upon every DL-UL change or UL-DL change.

The decision whether to associate a certain DL BWP and a certain UL BWP and to manage them together (e.g. switch them together) or to handle DL BWP and UL BWP independently should be made by GNB taking UE RF capability into account. It is also related with which FBG the serving cell's FB belongs to (e.g. whether the serving cell is the FDD cell or TDD cell).

FBG is the abbreviation of Frequency Band Group. FBG1 is the group of FDD bands. FBG2 is the group of TDD bands.

BWP information include initial BWP id, default BWP id, multiple of DL BWP information (s) and multiple of UL BWP information (s). If only initial BWP id is included, default BWP is same as initial BWP. If only default BWP id is included, initial BWP is same as default BWP. If neither default BWP id nor initial BWP id is included, BWP with BWP id 0 (or BWP with the lowest BWP id) is the default BWP and initial BWP. When a RRC message configured multiple BWPs, UE starts with the initial BWP and switch to other BWPs by GNB control. Upon certain event (like expiry of BWPinactivityTimer), UE switches to the default BWP.

DL BWP information consists of following information: BWP id, SCS, frequency domain location of the BWP (e.g. ARFCN indicating the center frequency of the BWP or PRB index/id of the center PRB), bandwidth of the BWP (e.g. the number of PRB), CSI-RS configurations UL BWP information consists of following information: BWP id, SCS, frequency domain location, bandwidth initial BWP information is provided in the system information. UE use the initial BWP until dedicate BWP is configured. dedicate BWP information is provided in the RRC control message. When dedicate BWP(s) are configured, UE start using initial BWP. When GNB instruct UE to switch the BWP, UE stops using (or deactivate) the initial BWP and start using (or activate) the indicated BWP. When BWP timer expires, UE switch to the default BWP (e.g. stop using the current BWP and start using the default BWP).

In the UL BWP of a certain serving cell (e.g. SpCell or PUCCH SCell), P-CSI and SP-CSI can be configured. In each of UL BWP information of those serving cells, one P-CSI reporting configuration and multiple SP-CSI reporting configurations can be signaled.

MAC PDU Format

Figure 12:
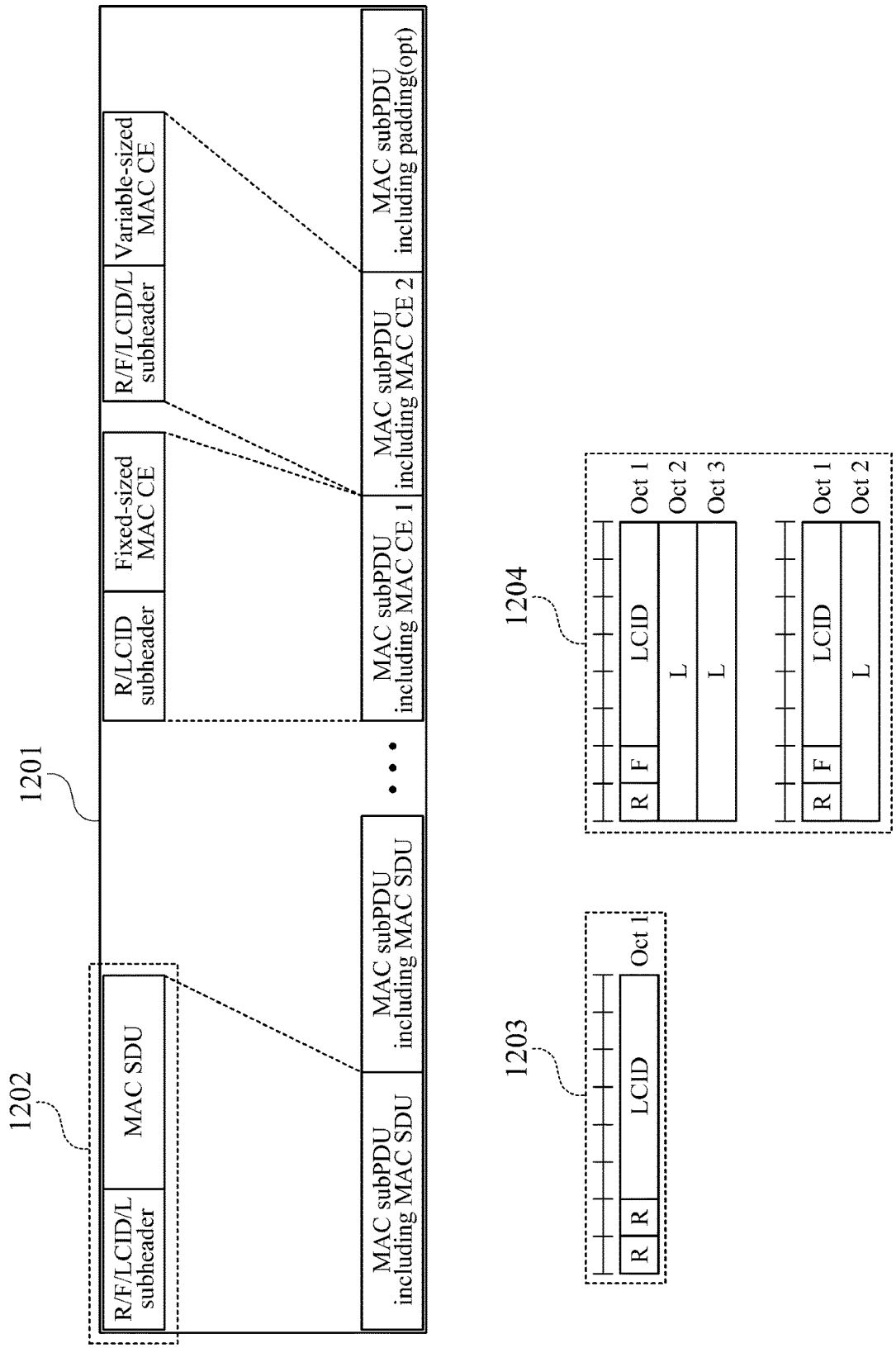
FIG. 12 is a diagram illustrating a format of MAC PDU.

A MAC PDU consists of one or more MAC subPDUs 1201 as described in FIG. 12. Each MAC subPDU consists of one of the following:

A MAC subheader only (including padding);
A MAC subheader and a MAC SDU 1202;
A MAC subheader and a MAC CE;
A MAC subheader and padding.

MAC SDU above can be CCCH message, DCCH message or DTCH message.

MAC subheader consists of R bit, F bit, LCID field and L field. In the disclosure, type 1 MAC subheader 1203 is the MAC subheader consisting only with two R bits and LCID field. Type 2 MAC subheader 1204 is the MAC subheader consisting with R bit, F bit, LCID field and L field.

LCID: The Logical Channel ID field identifies the logical channel instance of the corresponding MAC SDU or the type of the corresponding MAC CE or padding. There is one LCID field per MAC subheader. The LCID field size is 6 bits. For RRC message transmitted in SRB 0, either LCID 000000 or LCID 100001 is indicated depending on the type of message transmitted in the SRB0. For SRB1, LCID 000001 is indicated. For SRB2, LCID 000010 is indicated.

L: The Length field indicates the length of the corresponding MAC SDU or variable-sized MAC CE in bytes. There is one L field per MAC subheader except for subheaders corresponding to fixed-sized MAC CEs, padding and some CCCH SDUs. The size of the L field is indicated by the F field;

F: The Format field indicates the size of the Length field. There is one F field per MAC subheader except for subheaders corresponding to fixed-sized MAC CEs, padding and some CCCH SDUs. The size of the F field is 1 bit. The value 0 indicates 8 bits of the Length field. The value 1 indicates 16 bits of the Length field;

R: Reserved bit, set to zero.

DCI

DCI is the abbreviation of Downlink Control Information. It is interchangeable with PDCCH (Physical Downlink Control Channel). DCI is used for downlink assignment scheduling, uplink grant scheduling or other purposes.

IE

IE is Information Element and refer to the information included in the RRC message.

RRCRequest

RRC connection request(RRCRequest) message include following information elements: UE identity allocated by MME/AMF and establishment cause RRCSetup RRC connection setup(RRCSetup) message include following information elements: SRB1 configuration information, BWP configuration information(s) and other information necessary for UE and GNB to transmit and receive RRC messages.

RRC Reconfiguration

RRC connection reconfiguration(RRCReconfiguration) message include following information elements: SRB2 configuration information, DRB configuration information, BWP configuration information(s), DRX configuration, SPS configuration, SCell configuration and other information necessary for UE and GNB to transmit and receive DRB efficiently.

NR Configuration Information

NR configuration information consist of following information. NR serving cell configuration such as the center frequency of the serving cell, serving cell index; Bearer configuration such as NR PDCP configuration and NR RLC configuration; NR DRX configuration.

NR DRX Configuration Information

NR DRX configuration information consists of following information. NR onDurationTimer, NR inactivityTimer, NR Long-DRX cycle, NR Short-DRX cycle, NR DRX start offset, NR retransmissionTimer, NR UL retransmission-Timer, NR HARQ RTT timer and NR UL HARQ RTT timer.

PHR Configuration

PHR configuration consist of following information: A timer value for periodic reporting, a timer value to prohibit too frequent reporting and pathloss change threshold etc.

SCell Configuration

SCell configuration consist of following information: center frequency of the SCell, SCellIndex and serving cell information etc.

Serving Cell Information

Serving cell information consists of following information: BWP information, PDSCH configuration, PUSCH configuration, P-CSI reporting configuration per UL BWP of a specific uplink (if SpCell or PUCCH SCell), SP-CSI reporting configurations per UL BWP of a specific uplink (if SpCell or PUCCH SCell). When supplemental uplink is configured for SpCell or PUCCH SCell, Serving cell information indicate which uplink between SUL and UL the P-CSI reporting and SP-CSI reportings are configured.

Supplemental Uplink Configuration

Supplemental uplink configuration consist of following information: center frequency of the supplemental uplink, associated serving cell (if absent, the SUL is associated with PCell downlink), uplinkIndex etc. associated serving cell is indicated by SCellIndex, and the SUL is associated with the DL of the indicated serving cell. Being associated with DL of a serving cell means that pathloss of the serving cell is used in calculating the uplink transmission power, and PDCCH/DCI for the SUL can be transmitted from the associated serving cell.

Time Alignment Group

TAG is the Timing Advance Group. Timing Advance Group is a group of Serving Cells that is configured by RRC and that, for the cells with an UL configured, using the same timing reference cell and the same Timing Advance value. A Timing Advance Group containing the SpCell of a MAC entity is referred to as PTAG, whereas the term STAG refers to other TAGs. TAG is associated with a TAT (timeAlignmentTimer). TAT for a TAG starts when Timing Advance Command is received. When TAT expires, uplink timing of the TAG is considered not synchronized.

SPS/Configured Uplink Grant

SPS configuration information consists of three parts; common configuration information, DL SPS configuration information and UL SPS configuration information. Common configuration information that is applicable for both DL SPS and UL SPS. Common configuration information includes the information like SPS C-RNTI and the information to which serving cell the SPS configuration is applicable. DL SPS configuration includes the number of DL HARQ process that can be used for DL SPS and DL SPS periodicity. UL SPS configuration includes the number of UL HARQ processes that can be used for UL SPS and UL SPS periodicity.

C-RNTI is UE identity uniquely identifying UE in a given cell and used for dynamic scheduling.

SPS C-RNTI is used to activate or release SPS and different from C-RNTI (can be considered as additional C-RNTI for SPS scheduling). It can be called by different names (e.g. other than SPS C-RNTI)

DL SPS resource can be called configured downlink assignments.

UL SPS resource can be called configured uplink grant.

UL SPS can be called uplink transmission without grant or grant free transmission.

DL SPS activation (that SPS is activated) can be same as configured downlink assignment initialization (configured downlink assignment is initialized)

UL SPS activation (that SPS is activated) can be same as configured uplink grant initialization (configured uplink grant is initialized)

DL SPS deactivation (that SPS is deactivated) can be same as configured downlink assignment release (configured downlink assignment is released)

UL SPS deactivation (that SPS is deactivated) can be same as configured uplink grant release (configured uplink grant is released)

DL SPS or UL SPS is activated or deactivated by receiving PDCCH/DCI for UE's SPS C-RNTI.

UL SPS activation command is the PDCCH/DCI for SPS C-RNTI indicating to activate configured uplink grant.

The SPS confirmation MAC control element is identified by a MAC PDU subheader with a specific LCID and has fixed size of zero bits (e.g. it is MAC subhead only MAC CE). By receiving SPS confirmation MAC Control Element, GNB knows that the SPS activation/deactivation is successful.

RRC Message in General

In the disclosure, 'indicating A in a RRC message' can be same as 'instructing A' or 'commanding A', while A' is the action corresponding to A.

In the disclosure, 'receiving A in a RRC message' can be same as 'doing A' as a result of receiving the RRC message and decoding A'.

DRX

LTE DRX configuration information consists of following information. onDurationTimer, inactivityTimer, Long-DRX cycle, Short-DRX cycle, DRX start offset, retransmissionTimer and UL retransmissionTimer.

LTE DRX operation is as following. UE and ENB determines the starting subframe of on-Duration based on the DRX cycle and DRX start offset. UE and ENB starts onDuration and monitor PDCCH. If new transmission is scheduled, UE and ENB start inactivityTimer which is restarted when new transmission is scheduled. retransmissionTimer and UL retransmissionTimer are for retransmission to be scheduled. They start when HARQ RTT timer or UL HARQ RTT timer expires and stops when corresponding retransmission is scheduled. HARQ RTT timer and UL HARQ RTT timer start when DL assignment or UL grant is received.

SCell Activation/Deactivation MAC CE

The SCell Activation/Deactivation MAC CE (A/D MAC CE) of one octet is identified by a MAC PDU subheader with LCID. It has a fixed size and consists of a single octet containing seven C-fields and one R-field.

Ci: if there is an SCell configured with SCellIndex i as specified in TS 38.331 [8], this field indicates the activation/deactivation status of the SCell with SCellIndex i, else the MAC entity shall ignore the Ci field. The Ci field is set to "1" to indicate that the SCell with SCellIndex i shall be activated. The Ci field is set to "0" to indicate that the SCell with SCellIndex i shall be deactivated;

R: Reserved bit, set to "0".

Timing Advance Command MAC CE

The Timing Advance Command MAC CE is identified by MAC PDU subheader with LCID. It has a fixed size and consists of a single octet defined as follows.

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply (as specified in TS 38.213 [6]). The length of the field is 6 bits.

Multiple OFDM Numerologies

Multiple OFDM numerologies as given by Table below are supported in NR.

TABLE 4

| mu | Sub-Carrier Spacing (delta f) |
|---|---|
| 0 | 15 |
| 1 | 30 |
| 2 | 60 |
| 3 | 120 |
| 4 | 240 |

PUCCH SCell

A SCell configured with PUCCH. PUCCH SCell supports PUCCH transmission for serving cells belonging to the PUCCH Cell Group.

PUCCH Cell Group

A group of serving cells whose CSI and HARQ feedbacks are reported in a serving cell (either SpCell or PUCCH SCell). When PUCCH SCell is configured, the list of serving cells grouped together with the PUCCH SCell are signaled in the same RRC message. A PUCCH Cell Group containing the SpCell of a MAC entity is referred to as Primary PUCCH Cell group, whereas the term Secondary PUCCH Cell group refers to other TAGs (e.g. containing PUCCH SCell). The PUCCH Cell Group SCells not belonging to any Secondary PUCCH Cell Groups belong to Primary PUCCH Cell Group (where SpCell provides CSI and HARQ feedback)

Serving Cell

A Primary or a Secondary Cell in TS 38.331 [5]. Cell of Serving Cell is interchangeable with carrier.

Special Cell

For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention based Random Access, and is always activated.

Channel State Information

UE provides CSI to GNB via PUCCH or PUSCH. UE measures, according to GNB's instruction, certain time/frequency resource and report the result of the measurement in the form of CSI. CSI reporting can be either Persistent or Semi-persistent CSI Reporting Configuration CSI reporting configuration for Persistent CSI reporting (P-CSI reporting configuration) consists with following information: CSI-RS id for CSI-RS to be measured, CSI-RS reporting resource (in the form of index indicating periodically allocated PUCCH time/frequency resource in the corresponding/associated UL BWP), CSI-RS reporting format (in the form of index indicating the size of CSI report)

CSI reporting configuration for Semi Persistent CSI reporting (SP-CSI reporting configuration) consists with following information: CSI-RS id for CSI-RS to be measured, CSI-RS reporting resource (in the form of index indicating periodically allocated PUCCH time/frequency resource in the corresponding/associated UL BWP), CSI-RS reporting format (in the form of index indicating the size of CSI report)

SP-CSI REPORTING A/D MAC CE

The SP-CSI REPORTING Activation/Deactivation MAC CE is identified by a MAC PDU subheader with a specific LCID It has a configurable size of 8 bits, 16 bits or 32 bits with following fields:

$S_i$: if there is an SP-CSI report configuration configured with CSI-ReportConfigId i for the active UL BWP of SpCell or PUCCH SCell, this field indicates the activation/deactivation status of the SP-CSI report configuration with CSI-ReportConfigId i, otherwise the MAC entity shall ignore the $S_i$ field. The $S_i$ field is set to "1" to indicate that the SP-CSI report configuration with CSI-ReportConfigId i of UL relevant UL BWP of relevant serving cell shall be activated. The Si field is set to "0" to indicate that the SP-CSI report configuration with CSI-ReportConfigId i shall be deactivated.

The size of SP-CSI REPORTING A/D is determined by the highest CSI-ReportConfigId of the corresponding serving cell. The corresponding serving cell is either PUCCH SCell (if SP-CSI REPORTING A/D MAC CE is received in DL BWP of serving cell of Secondary PUCCH CG) or SpCell (if SP-CSI REPORTING A/D MAC CE is received in DL BWP of serving cell of Primary PUCCH CG).

The relevant serving cell is PUCCH SCell if SP-CSI REPORTING A/D MAC CE is received in DL BWP of serving cell of Secondary PUCCH CG and SpCell if SP-CSI REPORTING A/D MAC CE is received in DL BWP of serving cell of Primary PUCCH CG.

The relevant UL BWP is the active UL BWP of the relevant serving cell. If multiple UL BWPs are active, UL BWP of the uplink configured with PUCCH is the relevant UL BWP.

Meanwhile, the method and apparatus to receive and transmit data in a mobile communication system according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

Abbreviation

AM DRB Acknowledged Mode Data Radio Bearer
ARFCN Absolute Radio Frequency Channel Number
BS Buffer Status
BSR Buffer Status Report
BWP Bandwidth Part
CCCH Common Control Channel
CR Contention Resolution
C-RNTICell Radio Network Temporary Identifier
CSI Channel State Information
CSI-IM Channel State Information-Interference Measurement
CSI-RS Channel State Information-Reference Signal
DCI Downlink Control Information
DL Downlink
DRX Discontinuous Reception
eMBB enhanced Mobile Broadband
E-UTRAN Evolved Universal Terrestrial Radio Access Network
FB Frequency Band
FBG Frequency Band Group
FBI Frequency Band Indicator
FMC First Missing Count
GNB next Generation Node B
HARQ Hybrid Automatic Retransmission reQuest
HO Handover
LCH Logical Channel
LCID Logical Channel ID
LCP Logical Channel Prioritization
MAC Medium Access Control
MAC CE MAC Control Element
MCS Modulation Coding Scheme
MeNB Master eNode B
MIMO Multi Input Multi Output
MME Mobility Management Entity
MSB Most Significant Bit
MSI Minimum System Information
NR Next Radio
PCell Primary Cell
PDCCH Physical Downlink Control Channel
PDCP Packet Data Convergence Protocol
PDSCHPhysical Downlink Shared Channel
PDU Protocol Data Unit
PRB Physical Resource Block
PSS/SSS Primary Synchronization Signal/Secondary Synchronization Signal
PUCCH Physical Uplink Control Channel
PUCCH CG PUCCH Cell Group
PUSCHPhysical Uplink Shared Channel
RA Random Access
RACH Random Access Channel
RAR Random Access Response
RA-RNTI Random Access Radio Network Temporary Identifier
RAPID Random Access Preamble Identifier
RAT Radio Access Technology
RB Radio Bearer
RLC Radio Link Control
RLF Radio Link Failure
RMSI Remaining Minimum System Information
RRC Radio Resource Control
RSRP/RSRQ Reference Signal Received Power/Reference Signal Received Quality
RTT Round Trip Time
RV Redundancy Version
Scell Secondary cell
SCS Sub Carrier Spacing
SDAP Service Data Adaptation Protocol
SDU Service Data Unit
SgNB Secondary gNode B
SIB System Information Block
SIBG System Information Block Group SPS Semi-Persistent Scheduling
SP Semi-Persistent
SRB Signaling Radio Bearer
SRS Sounding Reference Signal
S-TMSI SAE-Temporary Mobile Subscriber Identity
SUL Supplemental Uplink
TA Timing Advance
TAC Timing Advance Command
TAT timeAlignmentTimer
TB Transport Block
TTI Transmission Time Interval
UE User Equipment; interchangeable with Terminal
UL Uplink
UM DRB Unacknowledged Mode Data Radio Bearer
URLLCUltra Reliable Low Latency
ZP Zero Power

What is claimed is:

1. A method by a terminal, the method comprising:
receiving, from a base station, a channel state information (CSI) report configuration in a radio resource control (RRC) message;
receiving, from the base station, semi persistent CSI (SP CSI) reporting on physical uplink control channel (PUCCH) medium access control (MAC) control element (CE) activating the CSI report configuration;
activating the CSI report configuration of a bandwidth part (BWP) of a serving cell as indicated in the received SP CSI reporting on the PUCCH MAC CE;
receiving, from the base station, a MAC CE;
determining whether the received MAC CE is SP CSI reporting on PUCCH MAC CE deactivating the CSI report configuration, or whether the received MAC CE is a secondary cell (SCell) activation/deactivation (A/D) MAC CE deactivating the serving cell;
deactivating the CSI report configuration of the BWP of the serving cell as indicated in the received MAC CE based on whether the received MAC CE is the SP CSI reporting on the PUCCH MAC CE deactivating the CSI report configuration; and
deactivating all CSI report configurations of all BWPs of the serving cell based on whether the received MAC CE is the SCell A/D MAC CE deactivating the serving cell corresponding to PUCCH SCell.

2. A terminal in a wireless communication system, the terminal comprising:
a transceiver configured to transmit and receive a signal; and
a controller configured to control the transceiver to:
receive, from a base station, a chancel state information (CSI) report configuration in a radio resource control (RRC) message;
receive, from the base station, semi persistent CSI (SP CSI) reporting on physical uplink control channel (PUCCH) medium access control (MAC) control element (CE) activating the CSI report configuration;
activate the CSI report configuration of a bandwidth part (BWP) of a serving cell as indicated in the received SP CSI reporting on the PUCCH MAC CE;
receive, from the base station, a MAC CE;
determine whether the received MAC CE is SP CSI reporting on PUCCH MAC CE deactivating the CSI report configuration, or whether the received MAC CE is a secondary cell (SCell) activation/deactivation (A/D) MAC CE deactivating the serving cell;
deactivate the CSI report configuration of the BWP of the serving cell as indicated in the received MAC CE based whether the received MAC CE is the SP CSI reporting on the PUCCH MAC CE deactivating the CSI report configuration; and
deactivate all CSI report configurations of all BWPs of the serving cell based on whether the received MAC CE is the SCell A/D MAC CE deactivating the serving cell corresponding to PUCCH SCell.

* * * * *